United States Patent
Okamoto

(10) Patent No.: US 10,057,576 B2
(45) Date of Patent: Aug. 21, 2018

(54) MOVING IMAGE CODING APPARATUS, MOVING IMAGE CODING METHOD, STORAGE MEDIUM, AND INTEGRATED CIRCUIT

(71) Applicant: MegaChips Corporation, Osaka-shi (JP)

(72) Inventor: Akira Okamoto, Osaka (JP)

(73) Assignee: Megachips Corporation, Osaka-shi (JP)

( * ) Notice: Subject to any disclaimer, the term of this patent is extended or adjusted under 35 U.S.C. 154(b) by 497 days.

(21) Appl. No.: 14/594,507

(22) Filed: Jan. 12, 2015

(65) Prior Publication Data
US 2015/0237375 A1  Aug. 20, 2015

(30) Foreign Application Priority Data
Feb. 19, 2014  (JP) ................................ 2014-029686

(51) Int. Cl.
*H04N 19/625* (2014.01)
*H04N 19/124* (2014.01)
(Continued)

(52) U.S. Cl.
CPC .......... *H04N 19/124* (2014.11); *H04N 19/14* (2014.11); *H04N 19/176* (2014.11); *H04N 19/115* (2014.11)

(58) Field of Classification Search
None
See application file for complete search history.

(56) References Cited

U.S. PATENT DOCUMENTS 6,222,881 B1 * 4/2001 Walker ................. H04N 19/176
375/240.02
(Continued)

FOREIGN PATENT DOCUMENTS

JP  2006-121131 A  5/2006
JP  2010-505342 A  2/2010
(Continued)

OTHER PUBLICATIONS

Office Action issued in corresponding Japanese Application No. 2014-029686 dated Jan. 9, 2018 (with English translation).
(Continued)

*Primary Examiner* — Andy Rao
*Assistant Examiner* — Samuel D Fereja
(74) *Attorney, Agent, or Firm* — Xsensus, LLP

(57) ABSTRACT

A moving image coding apparatus performs efficient moving image compression on video with much noise (with a poor S/N ratio), and enables appropriate bit rate control (code amount control). A first orthogonal transform unit performs orthogonal transform of an input moving image. A complexity obtaining unit obtains a complexity of the input moving image based on frequency component data obtained through orthogonal transform by the first orthogonal transform unit. A noise determination unit determines noise in the input moving image based on the frequency component data obtained through orthogonal transform by the first orthogonal transform unit. A code amount adjustment unit generates a code amount adjustment signal based on the complexity obtained by the complexity obtaining unit and the noise determination result obtained by the noise determination unit. A coding unit subjects the input moving image to a coding process including quantization using a quantization parameter value determined based on the code amount adjustment signal generated by the code amount adjustment unit.

15 Claims, 11 Drawing Sheets

(51) Int. Cl.
*H04N 19/176* (2014.01)
*H04N 19/14* (2014.01)
*H04N 19/115* (2014.01)

(56) References Cited

U.S. PATENT DOCUMENTS

| | | | | |
|---|---|---|---|---|
| 2002/0118748 | A1* | 8/2002 | Inomata | H04N 19/105 |
| | | | | 375/240.04 |
| 2005/0238239 | A1* | 10/2005 | Yankilevich | H04N 19/176 |
| | | | | 382/232 |
| 2007/0025447 | A1* | 2/2007 | Kojokaro | H04N 19/139 |
| | | | | 375/240.24 |
| 2011/0019929 | A1 | 1/2011 | Koyabu et al. | |
| 2011/0249728 | A1* | 10/2011 | Bock | H04N 19/15 |
| | | | | 375/240.03 |
| 2013/0177074 | A1* | 7/2013 | Togita | H04N 19/61 |
| | | | | 375/240.03 |

FOREIGN PATENT DOCUMENTS

| | | |
|---|---|---|
| JP | 2010-148014 A | 7/2010 |
| JP | 2010-166351 A | 7/2010 |
| JP | 5251774 B2 | 7/2013 |

OTHER PUBLICATIONS

Office Action dated Oct. 17, 2017 in Japanese Patent Application No. 2014-029686 (with English translation).

* cited by examiner

| Complexity | Noise determination result | |
|---|---|---|
| | Much noise (nosiy=1) | Little noise (noisy=0) |
| High (cmplx=1) | QP: Large | QP: Medium |
| Low (cmplx=0) | QP: Medium | QP: Small |

FIG. 6

| Noise determination result (Term determination) | | Complexity | |
|---|---|---|---|
| | | High (cmplx=1) | Low (cmplx=0) |
| Much noise (nosiy_term=1) | | QP:Large | QP:Medium |
| Little noise (noisy_term=0) | | QP:Medium | QP:Small |

FIG. 8

| | AC (7,0) | AC (7,1) | AC (7,2) | AC (7,3) | AC (7,4) | AC (7,5) | AC (7,6) | AC (7,7) |
|---|---|---|---|---|---|---|---|---|

For noise determination (second modification)

| DC | AC(0,1) | AC(0,2) | AC(0,3) | AC(0,4) | AC(0,5) | AC(0,6) | AC(0,7) |
| AC(1,0) | AC(1,1) | AC(1,2) | AC(1,3) | AC(1,4) | AC(1,5) | AC(1,6) | AC(1,7) |
| AC(2,0) | AC(2,1) | AC(2,2) | AC(2,3) | AC(2,4) | AC(2,5) | AC(2,6) | AC(2,7) |
| AC(3,0) | AC(3,1) | AC(3,2) | AC(3,3) | AC(3,4) | AC(3,5) | AC(3,6) | AC(3,7) |
| AC(4,0) | AC(4,1) | AC(4,2) | AC(4,3) | AC(4,4) | AC(4,5) | AC(4,6) | AC(4,7) |
| AC(5,0) | AC(5,1) | AC(5,2) | AC(5,3) | AC(5,4) | AC(5,5) | AC(5,6) | AC(5,7) |
| AC(6,0) | AC(6,1) | AC(6,2) | AC(6,3) | AC(6,4) | AC(6,5) | AC(6,6) | AC(6,7) |
| AC(7,0) | AC(7,1) | AC(7,2) | AC(7,3) | AC(7,4) | AC(7,5) | AC(7,6) | AC(7,7) |

AR_H1

AR_Lv

MOVING IMAGE CODING APPARATUS, MOVING IMAGE CODING METHOD, STORAGE MEDIUM, AND INTEGRATED CIRCUIT

This application claims priority to Japanese Patent Application No 2014-029686 filed on Feb. 19, 2014, the entire disclosure of which is hereby incorporated herein by reference (IBR).

BACKGROUND OF THE INVENTION

Field of the Invention

The present invention relates to a technique for coding moving images (video) for the compression of moving images (video), and more particularly, to a technique for controlling the code amount in the compression of moving images (video).

Description of the Background Art

Techniques for compressing moving images (video) may include predicting the amount of code to be generated and controlling the bit rate (controlling the code amount) appropriately.

With a technique described in Patent Literature 1 (Japanese Patent No. 5251774), for example, a pre-encoder and an intra pre-encoder first perform an encoding process on a moving image (video) and obtain the amount of code generated through the encoding process before a main encoder actually compresses the moving image (video). With the technique described in Patent Literature 1, a code amount controller determines a quantization parameter value based on the code amount generated through the encoding process performed by the pre-encoder and the intra pre-encoder. The main encoder then performs a compression process (an actual encoding process) on the moving image (video) by using the quantization parameter value determined by the code amount controller.

In this manner, the technique described in Patent Literature 1 allows highly precise prediction of the code amount to be generated by the moving image (video) compression process (actual encoding process) based on the code amount generated through the encoding process performed by the pre-encoder and the intra pre-encoder. With the technique described in Patent Literature 1, the quantization parameter value is determined based on the precisely predicted code amount to be generated, and the main encoder performs the moving image (video) compression process (actual encoding process) by using the quantization parameter value. The technique described in Patent Literature 1 enables appropriate bit rate control (code amount control).

However, the moving image compression process performed on video containing much noise (video having a poor signal-to-noise or S/N ratio) with the technique in Patent Literature 1 may yield a large code amount to be generated, disabling appropriate bit rate control (code amount control). Noise contained in video typically has low correlations in both temporal or spatial directions. Thus, the moving image compression process performed on the video containing much noise may fail to increase the compression ratio. The pre encoding process with the technique of Patent Literature 1 may fail to achieve efficient moving image compression for video containing much noise (video having a poor S/N ratio).

In view of the above problems, it is an object of the present invention to provide a moving image coding apparatus, a moving image coding method, a storage medium, and an integrated circuit that allow efficient moving image compression of video containing much noise (video having a poor S/N ratio) and enable appropriate bit rate control (code amount control).

SUMMARY

To solve the above problems, a first aspect of the invention provides a moving image coding apparatus including a first orthogonal transform unit, a complexity obtaining unit, a noise determination unit, a code amount adjustment unit, and a coding unit.

The first orthogonal transform unit performs orthogonal transform of an input moving image including a plurality of frame images.

The complexity obtaining unit obtains a complexity of the input moving image based on frequency component data obtained through the orthogonal transform performed by the first orthogonal transform unit.

The noise determination unit determines noise contained in the input moving image based on the frequency component data obtained through the orthogonal transform performed by the first orthogonal transform unit.

The code amount adjustment unit generates a code amount adjustment signal based on the complexity obtained by the complexity obtaining unit and a result of the noise determination performed by the noise determination unit.

The coding unit subjects the input moving image to a coding process including quantization. The coding unit performs the quantization using a quantization parameter value determined based on the code amount adjustment signal generated by the code amount adjustment unit.

BRIEF DESCRIPTION OF THE DRAWINGS

FIG. 3 is a diagram showing a processing target block consisting of eight by eight pixels (an 8×8 DCT block).

FIG. 5 is a diagram of a processing target block consisting of eight by eight pixels (an 8×8 DCT block).

FIG. 6 is a diagram showing the relationship between the noise determination result and the complexity, and the corresponding QP values.

FIG. 8 is a diagram showing the relationship between the noise determination result and the complexity, and the corresponding QP values.

FIG. 9 is a diagram showing a processing target block (DCT block) consisting of eight by eight pixels.

FIG. 10 is a diagram showing a processing target block (DCT block) consisting of eight by eight pixels.

FIG. 11 is a diagram showing a processing target block (DCT block) consisting of eight by eight pixels.

DESCRIPTION OF THE PREFERRED EMBODIMENTS

First Embodiment

A first embodiment will be described with reference to the drawings.

1.1 Structure of Moving Image Coding Apparatus

Figure 1:
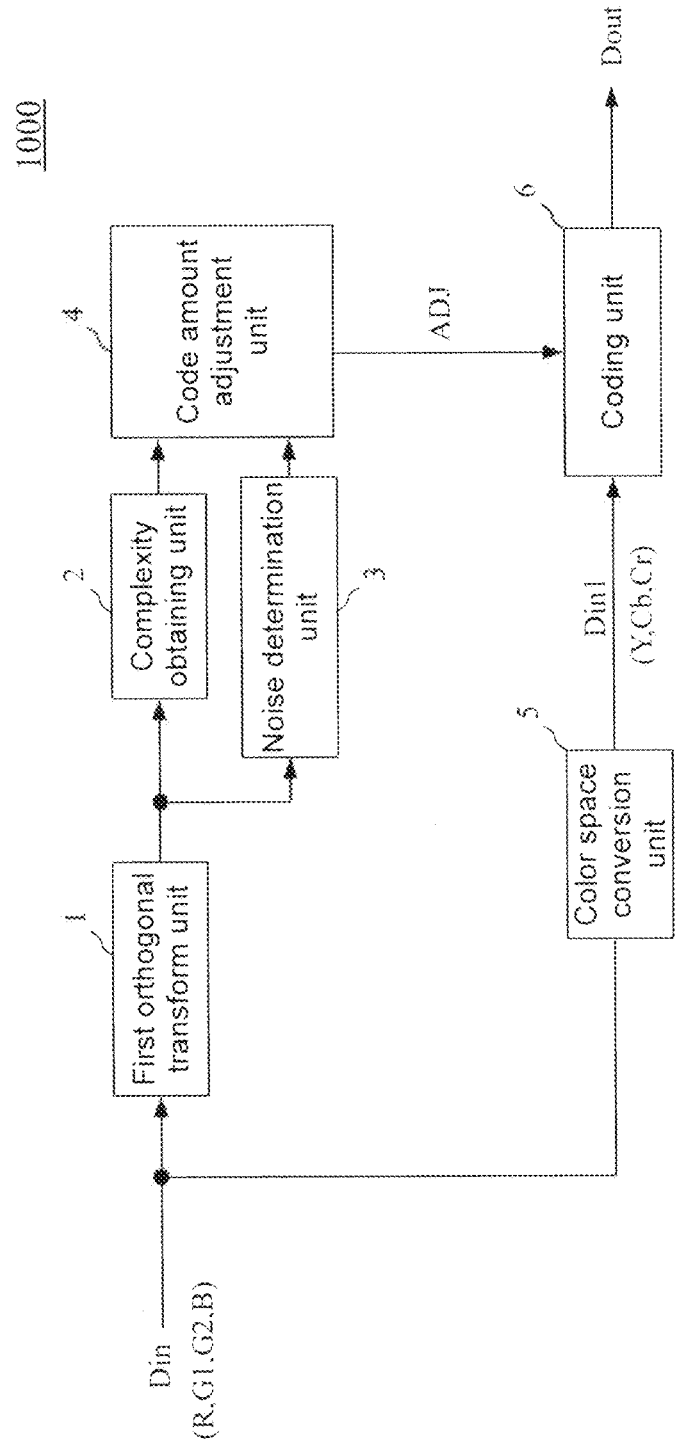
FIG. 1 is a schematic diagram showing the structure of a moving image coding apparatus 1000 according to a first embodiment.

FIG. 1 is a schematic diagram showing the structure of a moving image coding apparatus 1000 according to the first embodiment.

Figure 2:
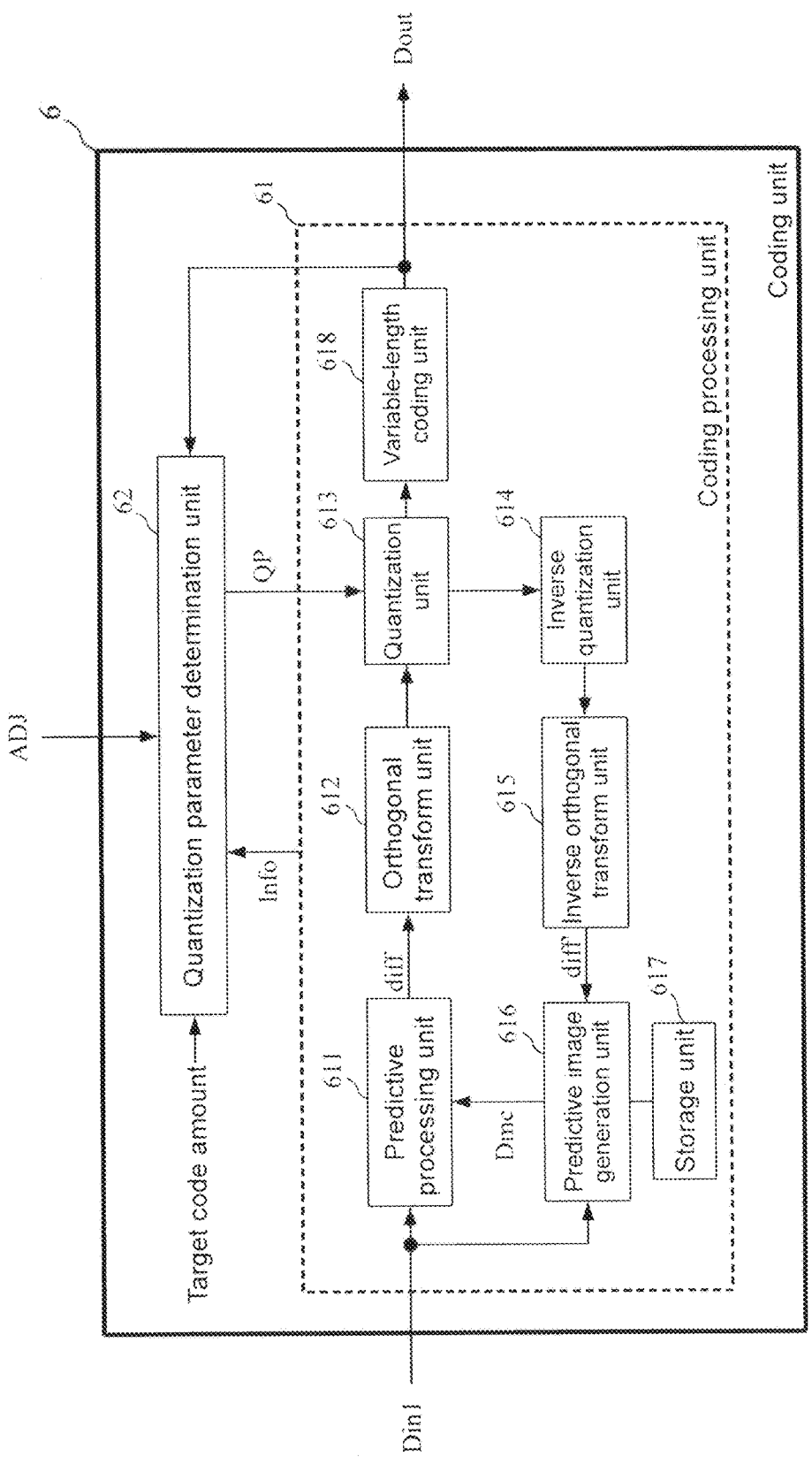
FIG. 2 is a schematic diagram (an example) showing the structure of a coding unit 6 included in the moving image coding apparatus 1000 according to the first embodiment.

FIG. 2 is a schematic diagram showing the structure (an example) of a coding unit 6 included in the moving image coding apparatus 1000 according to the first embodiment.

As shown in FIG. 1, the moving image coding apparatus 1000 includes a first orthogonal transform unit 1, which performs orthogonal transform of an input moving image signal Din (input moving image Din), a complexity obtaining unit 2, which obtains the complexity of the input moving image Din (e.g., the complexity in units of pictures) based on frequency components obtained through the orthogonal transform performed by the first orthogonal transform unit 1, and a noise determination unit 3, which determines noise contained in the input moving image Din based on the frequency components obtained through the orthogonal transform performed by the first orthogonal transform unit 1.

The moving image coding apparatus 1000 further includes a code amount adjustment unit 4, which generates a code amount adjustment signal ADJ based on the complexity of the input moving image Din obtained by the complexity obtaining unit 2 and the result of noise determination performed by the noise determination unit 3, and a color space conversion unit 5, which subjects the input moving image signal Din to color space conversion to obtain a moving image signal Din1.

The moving image coding apparatus 1000 further includes a coding unit 6, which subjects the moving image Din1 to a coding process in accordance with the code amount adjustment signal ADJ.

For ease of explanation, the input moving image signal Din is a moving image signal obtained by an imaging apparatus including an image sensor having a Bayer array of color filters. The input moving image signal Din described below includes an R-color component signal, a G1-color component signal (a G-color component signal obtained through a G-color filter arranged in the same row as an R-color filter in the Bayer array of color filters), a G2-color component signal (a G-color component signal obtained through a G-color filter arranged in the same row as a B-color filter in the Bayer array of color filters), and a B-color component signal.

The first orthogonal transform unit 1 receives the input moving image signal Din (input moving image Din). The first orthogonal transform unit 1 performs orthogonal transform of the input moving image Din. The first orthogonal transform unit 1 performs, for example, orthogonal transform such as discrete cosine transform (DCT) or integer transform of the input moving image Din (single frame image) in units of macroblocks (e.g., in units of macroblocks each consisting of four by four pixels or eight by eight pixels). The first orthogonal transform unit 1 outputs data (frequency component data) resulting from the orthogonal transform to the complexity obtaining unit 2 and the noise determination unit 3.

The first orthogonal transform unit 1 may perform the above processing only on a particular component of the input moving image signal Din (e.g., a G2-color component signal).

The complexity obtaining unit 2 receives the frequency component data output from the first orthogonal transform unit 1. The complexity obtaining unit 2 obtains the complexity of the input moving image Din based on the input frequency component data (described in detail below). The complexity obtaining unit 2 outputs a signal indicating the obtained complexity of the input moving image Din to the code amount adjustment unit 4.

The noise determination unit 3 receives the frequency component data output from the first orthogonal transform unit 1. The noise determination unit 3 determines the condition of noise contained in the input moving image Din based on the input frequency component data (described in detail below). The noise determination unit 3 outputs a signal indicating the condition of noise contained in the input moving image Din to the code amount adjustment unit 4.

The code amount adjustment unit 4 receives a signal indicating the complexity of the input moving image Din output from the complexity obtaining unit 2, and a signal indicating the noise determination result output from the noise determination unit 3. The code amount adjustment unit 4 generates a code amount adjustment signal ADJ based on the complexity obtained by the complexity obtaining unit 2 and the result of noise determination performed by the noise determination unit 3. The code amount adjustment unit 4 outputs the generated code amount adjustment signal ADJ to the coding unit 6.

The color space conversion unit 5 receives an input moving image signal Din, and subjects the input moving image signal Din to color space conversion (e.g., color space conversion from the RGB color space to the YCbCr color space). The color space conversion unit 5 outputs a moving image signal resulting from the color space conversion as a moving image signal Din1 (moving image Din1) to the coding unit 6. When the input moving image signal Din is a moving image signal including a color component that can be processed by the signal coding unit 6, the color space conversion unit 5 may be eliminated.

The coding unit 6 receives the moving image signal Din1 output from the color space conversion unit 5 and the code amount adjustment signal ADJ output from the code amount adjustment unit 4. The coding unit 6 subjects the moving image Din1 to a coding process in accordance with the code amount adjustment signal ADJ. The coding unit 6 then outputs the data, (coded data) Dout, resulting from the coding process.

As shown in FIG. 2, the coding unit 6 includes a coding processing unit 61 and a quantization parameter determination unit 62.

As shown in FIG. 2, the coding processing unit 61 includes a predictive processing unit 611, an orthogonal transform unit 612, a quantization unit 613, an inverse quantization unit 614, an inverse orthogonal transform unit 615, a predictive image generation unit 616, a storage unit 617, and a variable-length coding unit 618. The coding processing unit 61 is, for example, an H.264/MPEG-4 AVC or MPEG2 encoder.

The predictive processing unit 611 receives the moving image signal Din1, and a predictive image signal output from the predictive image generation unit 616. The predictive processing unit 611 obtains a predictive error signal (predictive error image) diff based on the moving image signal Din1, and the predictive image signal Dmc (predictive image Dmc) obtained by the predictive image generation unit 616. The predictive processing unit 611 outputs the obtained predictive error signal (predictive error image) diff to the orthogonal transform unit 612.

The orthogonal transform unit 612 receives the predictive error signal (predictive error image) diff output from the predictive processing unit 611. The orthogonal transform unit 612 performs orthogonal transform of the input predictive error image. The orthogonal transform unit 612 performs, for example, orthogonal transform, such as DCT or integer transform, of the input predictive error image diff in units of macroblocks (e.g., in units of macroblocks each consisting of four by four pixels or eight by eight pixels). The orthogonal transform unit 612 outputs the data resulting from the orthogonal transform (frequency component data) to the quantization unit 613.

The quantization unit 613 receives the frequency component data output from the orthogonal transform unit 612 and the quantization parameter value QP output from the quantization parameter determination unit 62. The quantization unit 613 quantizes the frequency component data output from the orthogonal transform unit 612 based on the quantization parameter value QP output from the quantization parameter determination unit 62. The quantization unit 613 outputs the data resulting from the quantization (quantized data) to the inverse quantization unit 614 and the variable-length coding unit 618.

The inverse quantization unit 614 receives the quantized data output from the quantization unit 613. The inverse quantization unit 614 inversely quantizes the quantized data output from the quantization unit 613 to obtain frequency component data. The inverse quantization unit 614 outputs the obtained frequency component data to the inverse orthogonal transform unit 615.

The inverse orthogonal transform unit 615 receives the frequency component data output from the inverse quantization unit 614. The inverse orthogonal transform unit 615 performs inverse orthogonal transform of the input frequency component data to obtain a predictive error image diff'. The inverse orthogonal transform unit 615 then outputs the obtained predictive error image diff' to the predictive image generation unit 616.

The predictive image generation unit 616 receives the moving image Din1 output from the color space conversion unit 5 and the predictive error image diff'output from the inverse orthogonal transform unit 615. The predictive image generation unit 616 performs motion estimation and motion compensation by using a reference image stored in the storage unit 617 and the moving image Din1 to obtain a predictive image signal Dmc (predictive image Dmc). The predictive image generation unit 616 outputs the obtained predictive image Dmc to the predictive processing unit 611. The predictive image generation unit 616 adds the predictive image Dmc and the predictive error image diff' together to generate a moving image Din1' (=Dmc+diff'). The generated moving image Din1' (the image Din1' serving as a current frame image) is stored into the storage unit 617. The moving image Din1' (the image Din1' serving as a current frame image) stored in the storage unit 617 is used as a reference image in processing for subsequent frames.

The storage unit 617 stores the moving image data generated by the predictive image generation unit 616. The data stored in the storage unit 617 is read by the predictive image generation unit 616 as needed.

The variable-length coding unit 618 receives the quantized data output from the quantization unit 613. The variable-length coding unit 618 subjects the input quantized data to a variable-length coding process, and outputs the data resulting from the variable-length coding process as the output data Dout (coded data Dout).

The quantization parameter determination unit 62 receives the data Dout output from the variable-length coding unit 618 and the code amount adjustment signal ADJ output from the code amount adjustment unit 4. The quantization parameter determination unit 62 receives a target code amount and various sets of data Info (data used to determine the quantization parameter value) output from the coding processing unit 61. The quantization parameter determination unit 62 determines the quantization parameter value QP based on the target code amount, the output data Dout, and the code amount adjustment signal ADJ, and the various sets of data Info output from the coding processing unit 61. The quantization parameter determination unit 62 outputs a signal indicating the determined quantization parameter value QP to the quantization unit 613.

1.2 Operation of Moving Image Coding Apparatus

The operation of the moving image coding apparatus 1000 with the above-described structure will now be described.

As shown in FIG. 1, the input moving image signal Din (input moving image Din) is input into the first orthogonal transform unit 1 and the color space conversion unit 5.

The first orthogonal transform unit 1 performs, for example, orthogonal transform, such as DCT or integer transform, of the input moving image Din in units of macroblocks each consisting of four by four pixels or eight by eight pixels to obtain frequency component data (e.g., DCT coefficient data). The obtained frequency component data is output to the complexity obtaining unit 2 and the noise determination unit 3.

The first orthogonal transform unit 1 may perform the above processing on only a particular color component signal (e.g., a G2-color component signal) in the input moving image signal Din (input moving image Din). This uses less calculations than when the processing is performed on all the color component signals (an R-color component signal, a G1-color component signal, a G2-color component signal, and a B-color component signal) of the input moving image signal Din (input moving image Din).

The complexity obtaining unit 2 obtains a complexity cmplx based on the frequency component data output from the first orthogonal transform unit 1.

1.2.1 Obtaining Complexity Cmplx

A process for obtaining the complexity cmplx performed by the complexity obtaining unit 2 will now be described.

For ease of explanation, the orthogonal transform performed by the first orthogonal transform unit is DCT, and its processing target block (the block that undergoes DCT, or the DCT block) includes eight by eight pixels.

Figure 3:
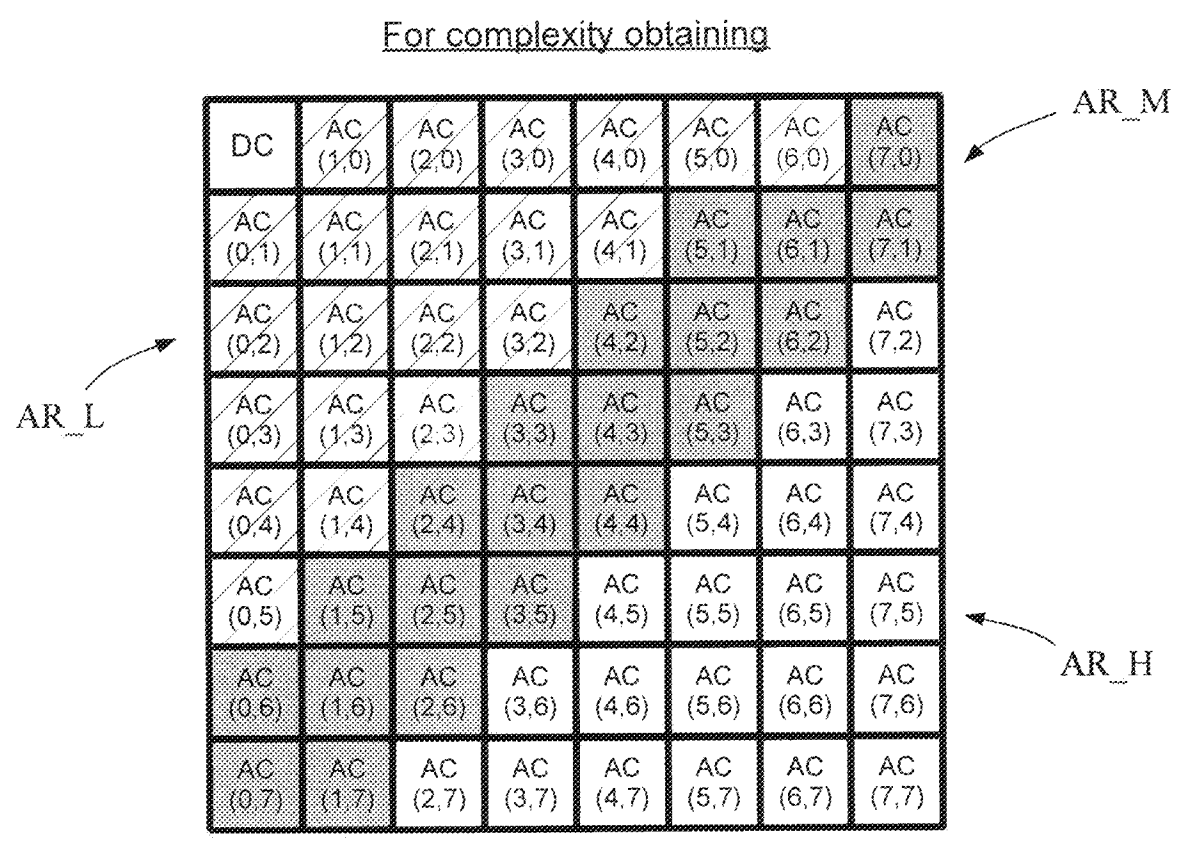

FIG. 3 shows a processing target block (DCT block) consisting of eight by eight pixels. As shown in FIG. 3, each piece of frequency component data (DCT coefficient data) constituting the processing target block (DCT block) is referred to as DC or AC(x, y) (where x and y are integers, and $0 \le x \le 7$, and $0 \le y \le 7$, excluding the cases of x=0 and y=0). In detail, DC is DCT coefficient data indicating a direct current component, whereas AC(x, y) is DCT coefficient data indicating an alternating current component. Additionally, N is the number of DCT blocks included in a single frame image (where N is a natural number). Further, DC(i) is DCT coefficient data indicating a direct current component of the i-th DCT block (where i is a natural number, and $1 \le i \le N$), whereas AC(x, y, i) is DCT coefficient data AC(x, y) indicating an alternating current component of the i-th DCT block.

The complexity obtaining unit 2 normalizes the DCT coefficient data AC(x, y, i) indicating an alternating current component in the i-th DCT block by using a direct current component DC(i). More specifically, the complexity obtaining unit 2 obtains the normalized DCT coefficient data AC(x, y, i) indicating an alternating current component using the formula below:

$$AC(x,y,i)=AC(x,y,i)/DC(i).$$

The complexity obtaining unit 2 performs this process on each of all the DCT blocks included in the single frame image (N DCT blocks).

The complexity obtaining unit 2 adds up the component data with the same frequency (the same positioned DCT coefficient data in each DCT block) included in each of all the DCT blocks included in the single frame image (N blocks). More specifically, the complexity obtaining unit 2 calculates an integrated value Sum_AC(x, y) of pieces of frequency component data (DCT coefficient data pieces) through the processing written by the formula below.

Formula 1

$$\text{Sum\_AC}(x, y) = \sum_{i=1}^{N} \text{AC}(x, y, i) \quad (1)$$

When the DCT block consists of eight by eight pixels, an integrated value Sum_AC of 63 pieces of frequency component data (DCT coefficient data) is obtained.

The complexity obtaining unit 2 obtains the sum Sum_L of the integrated values Sum_AC(x, y) of the frequency component data pieces included in an area AR_L indicating low-frequency alternating-current components (low-frequency area AR_L). The low-frequency area AR_L is, for example, a hatched area shown in FIG. 3 including pieces of frequency component data. In the example of FIG. 3, the low-frequency area AR_L includes 21 (=63/3) pieces of frequency component data AC(1, 0) to AC(6, 0), AC(0, 1) to AC(4, 1), AC(0, 2) to AC(3, 2), AC(0, 3) to AC(2, 3), AC(0, 4) to AC(1, 4), and AC(0, 5).

More specifically, the complexity obtaining unit 2 obtains the sum (low-frequency integrated value) Sum_L of the integrated values Sum_AC(x, y) of frequency component data included in the low-frequency area AR_L through the processing written by the formula below.

Formula 2

$$\text{Sum\_L} = \sum_{x, y \in AR\_L} \text{Sum\_AC}(x, y) \quad (2)$$

In the above formula, x, y∈AR_L indicates frequency component data (x, y) included in the low-frequency area described above. The above formula is used to calculate the sum of the integrated values Sum_AC(x, y) of frequency component data included in the low-frequency area AR_L.

The complexity obtaining unit 2 obtains the sum Sum_M of the integrated values Sum_AC(x, y) of frequency component data included in the area AR_M indicating medium frequency alternating current components (in the medium-frequency area AR_M). The medium-frequency area AR_M includes, for example, frequency-component data in a shaded area shown in FIG. 3. In the example of FIG. 3, the medium-frequency area AR_M includes 21 pieces (=63/3) of frequency component data AC(7, 0), AC(5, 1) to AC(7, 1), AC(4, 2) to AC(6, 2), AC(3, 3) to AC(5, 3), AC(2, 4) to AC(4, 4), AC(1, 5) to AC(3, 5), AC(0, 6) to AC(2, 6), and AC(0, 7) to AC(1, 7).

More specifically, the complexity obtaining unit 2 calculates the sum (medium-frequency integrated value) Sum_M of the integrated values Sum_AC(x, y) of frequency component data included in the medium-frequency area AR_M through the processing written by the formula below.

Formula 3

$$\text{Sum\_M} = \sum_{x, y \in AR\_M} \text{Sum\_AC}(x, y) \quad (3)$$

In the above formula, x, y∈AR_M indicates frequency component data (x, y) in the medium-frequency area described above. The above formula is used to calculate the sum of the integrated values Sum_AC(x, y) of frequency component data included in the medium-frequency area AR_M.

The complexity obtaining unit 2 obtains the sum Sum_H of the integrated values Sum_AC(x, y) of frequency component data included in the area AR_H (high-frequency area AR_H). The high-frequency area AR_H includes, for example, frequency component data indicated by an unshaded (white) area shown in FIG. 3. In the example of FIG. 3, the high-frequency area AR_H includes 21 pieces (=63/3) of frequency component data AC(7, 2), AC(6, 3) to AC(7, 3), AC(5,4) to AC(7, 4), AC(4, 5) to AC(7, 5), AC(3, 6) to AC(7, 6), and AC(2, 7) to AC(7, 7).

More specifically, the complexity obtaining unit 2 obtains the sum (high-frequency integrated value) Sum_H of the integrated values Sum_AC(x, y) of frequency component data included in the high-frequency area AR_H through the processing written by the formula below.

Formula 4

$$\text{Sum\_H} = \sum_{x, y \in AR\_H} \text{Sum\_AC}(x, y) \quad (4)$$

In the above formula, x, y∈AR_H indicates frequency component data (x, y) in the high-frequency area described above. The above formula is used to calculate the sum of the integrated values Sum_AC(x, y) of frequency component data included in the high-frequency area AR_H.

Through the processing (1), (2), or (3), which will be described below, the complexity obtaining unit 2 obtains the complexity cmplx based on the low-frequency integrated value Sum_L, the medium-frequency integrated value Sum_M, and the high-frequency integrated value Sum_H obtained as described above. The complexity cmplx is set to 1 when the current frame image (processing target frame image) is determined to be complex. The complexity cmplx is set to 0 when the current frame image (processing target frame image) is determined not to be complex.

(1) The complexity obtaining unit 2 determines that the current frame image (processing target frame image) is complex when Sum_*M*/(Sum_*L*+Sum_*M*+Sum_*H*)>*Th*1, where *Th*1 is a threshold.

In this case, the complexity obtaining unit 2 sets the complexity cmplx as cmplx=1.

In any other cases, the complexity obtaining unit 2 determines that the current frame image (processing target frame image) is not complex, and sets the complexity cmplx as cmplx=0.

(2) The complexity obtaining unit 2 determines that the current frame image (processing target frame image) is complex when $$(Sum\_M + Sum\_H)/(Sum\_L + Sum\_M + Sum\_H) > Th2,$$
where $Th2$ is a threshold.

In this case, the complexity obtaining unit 2 sets the complexity cmplx as cmplx=1. In any other cases, the complexity obtaining unit 2 determines that the current frame image (processing target frame image) is not complex, and sets the complexity cmplx as cmplx=0.

(3) The complexity obtaining unit 2 determines that the current frame image (processing target frame image) is complex when $$Sum\_M/(Sum\_L + Sum\_M) > Th3, \text{ where } Th3 \text{ is a threshold.}$$

In this case, the complexity obtaining unit 2 sets the complexity cmplx as cmplx=1.

In any other cases, the complexity obtaining unit 2 determines that the current frame image (processing target frame image) is not complex, and sets the complexity cmplx as cmplx=0.

Through the processing of (1), (2), or (3) described above, the complexity obtaining unit 2 determines whether the current frame image (processing target frame image) is complex. More specifically, when medium frequency components and/or high-frequency components constitute a proportion higher than a predetermined proportion in the distribution of frequency components (the distribution of low-frequency components, medium frequency components, and high-frequency components) included in a single frame image, the complexity obtaining unit 2 determines that the frame image is complex. The process for determining the complexity of a frame image performed by the complexity obtaining unit 2 should not be limited to the above process, and other processes (other determination methods) may be used.

Split Determination Process (Complexity)

When the complexity cmplx is set to 0 through the above process (hereafter referred to as the overall determination process), or specifically when the current frame image is determined not to be complex, the complexity obtaining unit 2 may additionally perform a determination process using split image areas described below (hereafter referred to as a split determination process). The split determination process will now be described with reference to FIG. 4.

Figure 4:
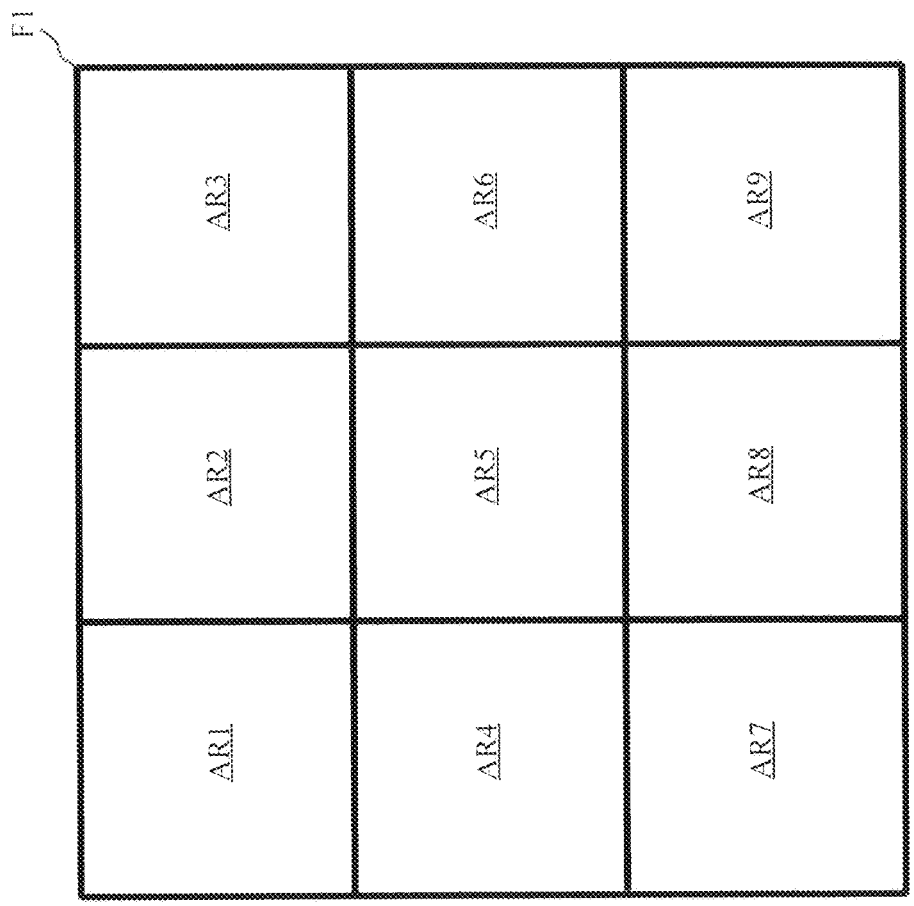
FIG. 4 is a schematic diagram of nine split image areas R1 to R9 of a current frame image F1 (processing target frame image F1).

FIG. 4 is a schematic diagram showing nine split image areas R1 to R9 included in a current frame image F1 (processing target frame image F1). Although FIG. 4 shows the current frame image F1 as a square image, its width to height ratio (aspect ratio) of the current frame image F1 may be other than the square ratio.

In the split determination process, the complexity obtaining unit 2 calculates an integrated value Sum_AC(x, y) of pieces of frequency component data (DCT coefficient data) for each of the split image areas shown in FIG. 4. The nine split image areas R1 to R9 each consist of M DCT blocks.

The complexity obtaining unit 2 calculates an integrated value Sum_AC(x, y) of pieces of frequency component data (DCT coefficient data) for each of the split image areas R1 to R9 through the processing written by the formula below.

Formula 5

$$Sum\_AC(x, y) = \sum_{i=1}^{M} AC(x, y, i) \quad (5)$$

In the same manner as in the overall determination process, the complexity obtaining unit 2 calculates the low-frequency integrated value Sum_L, the medium-frequency integrated value Sum_M, and the high-frequency integrated value Sum_H through the processing written by Formulae 2 to 4.

Through the processing (1), (2), or (3), which will be described below, the complexity obtaining unit 2 obtains a split area complexity cmplx_d based on the low-frequency integrated value Sum_L, the medium-frequency integrated value Sum_M, and the high-frequency integrated value Sum_H obtained as described above. The split area complexity cmplx_d is set to 1 when the processing target split image area is determined to be complex, and is set to 0 when the processing target split image area is determined not to be complex.

(1) The complexity obtaining unit 2 determines that the processing target split image area is complex when $$Sum\_M/(Sum\_L + Sum\_M + Sum\_H) > Th1, \text{ where } Th1 \text{ is a threshold.}$$

In this case, the complexity obtaining unit 2 sets the split area complexity cmplx_d as cmplx_d=1.

In any other cases, the complexity obtaining unit 2 determines that the processing target split image area is not complex, and sets the split area complexity cmplx_d as cmplx_d=0.

(2) The complexity obtaining unit 2 determines that the processing target split image area is complex when $$(Sum\_M + Sum\_H)/(Sum\_L + Sum\_M + Sum\_H) > Th2,$$
where $Th2$ is a threshold.

In this case, the complexity obtaining unit 2 sets the split area complexity cmplx_d as cmplx_d=1.

In any other cases, the complexity obtaining unit 2 determines that the processing target split image area is not complex, and sets the split area complexity cmplx_d as cmplx_d=0.

(3) The complexity obtaining unit 2 determines that the processing target split image area is complex when $$Sum\_M/(Sum\_L + Sum\_M) > Th3, \text{ where } Th3 \text{ is a threshold.}$$

In this case, the complexity obtaining unit 2 sets the split area complexity cmplx_d as cmplx_d=1.

In any other cases, the complexity obtaining unit 2 determines that the processing target split image area is not complex, and sets the split area complexity cmplx_d as cmplx_d=0.

Through the processing of (1), (2), or (3) described above, the complexity obtaining unit 2 determines whether the current frame image (processing target frame image) is complex. More specifically, when medium frequency components and/or high-frequency components constitute a proportion higher than a predetermined proportion in the distribution of frequency components (the distribution of low-frequency components, medium frequency components, and high-frequency components) included in a split image area, the complexity obtaining unit 2 determines that the split image area is complex.

The complexity obtaining unit 2 performs the above processing on each of the split image areas R1 to R9, counts the number of split image areas for which the split area complexity cmplx_d is 1, and substitutes the resulting count number into the count value num_cmplx. When num_cmplx>Th_num1, where Th_num1 is a threshold, or specifically when the number of split image areas each determined to be complex is greater than the predetermined number Th_num1, the complexity obtaining unit 2 determines that the frame image F1 (current frame image F1) is complex, and sets the complexity as cmplx=1.

Through the processing described above, the complexity obtaining unit 2 obtains the complexity cmplx. The signal indicating the complexity cmplx obtained by the complexity obtaining unit 2 is output to the code amount adjustment unit 4.

1.2.2 Noise Determination Process

A noise determination process performed by the noise determination unit 3 will now be described.

The noise determination unit 3 performs the noise determination process based on frequency component data output from the first orthogonal transform unit 1.

Figure 5:
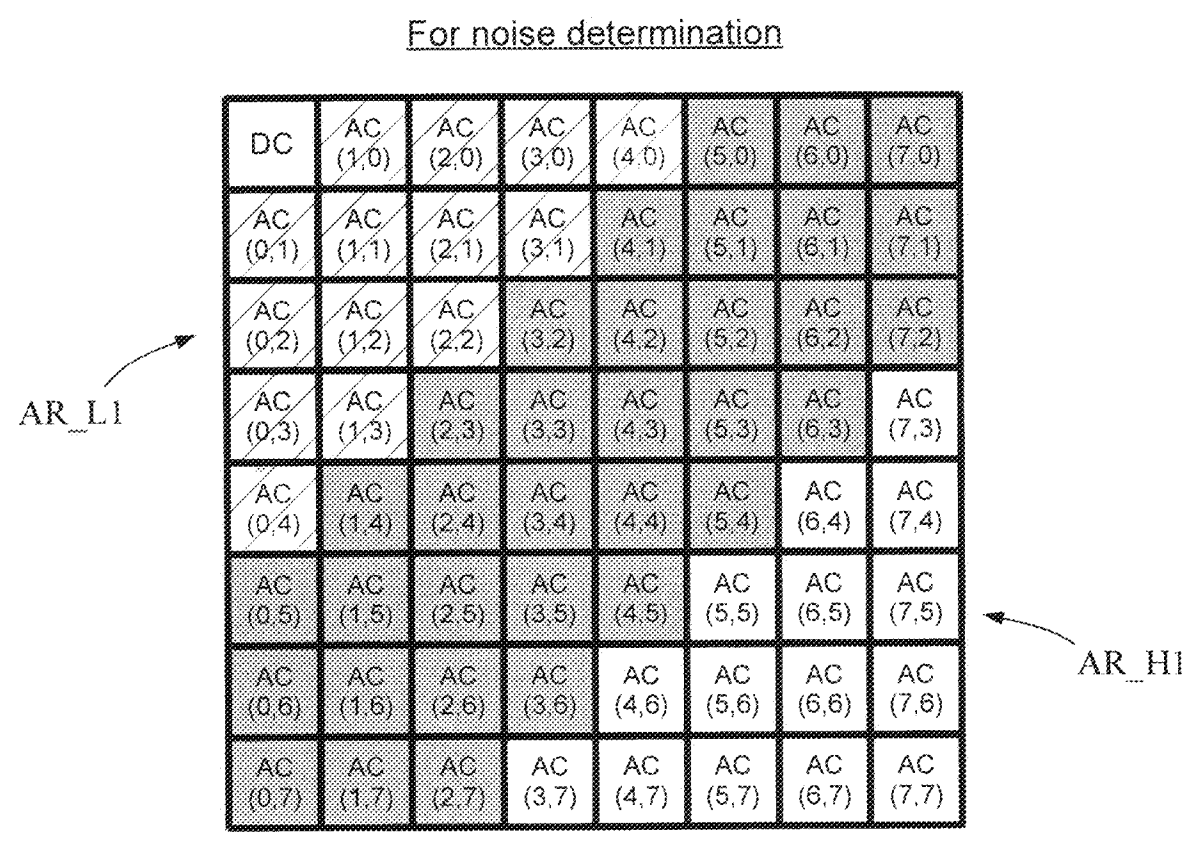

FIG. 5 is a diagram showing a processing target block (DCT block) consisting of eight by eight pixels. In FIG. 5, pieces of frequency component data (DCT coefficient data) indicated by a hatched area are included in the low-frequency area AR_L1, whereas pieces of frequency component data (DCT coefficient data) indicated by a white area at the lower right are included in the high-frequency area AR_H1.

The noise determination unit 3 normalizes DCT coefficient data AC(x, y, i) indicating an alternating current component in the i-th DCT block by using a direct current component DC(i). More specifically, the noise determination unit 3 obtains normalized DCT coefficient data AC(x, y, i) indicating an alternating current component as AC(x, y, i)=AC(x, y, i)/DC(i).

The noise determination unit 3 adds frequency component data (DCT coefficient data) included in the low-frequency area AR_L1 in the i-th DCT block to obtain a low-frequency component sum L1(i).

More specifically, the noise determination unit 3 obtains the low-frequency component sum L1(i), which is an integrated value of frequency component data included in the low-frequency area AR_L1 in the i-th DCT block through the processing written by the formula below.

Formula 6

$$L1(i) = \sum_{x,y \in AR\_L1} AC(x, y, i) \qquad (6)$$

In the above formula, x, y∈AR_L1 indicates frequency component data (x, y) included in the low-frequency area AR_L1. The above formula is used to calculate the sum L1(i) of the integrated values of frequency component data included in the low-frequency area AR_L1.

The noise determination unit 3 further adds the frequency component data (DCT coefficient data) included in the high-frequency area AR_H1 in the i-th DCT block to obtain a high-frequency component sum H1(i).

More specifically, the noise determination unit 3 obtains the high-frequency component sum H1(i), which is an integrated value of frequency component data included in the high-frequency area AR_H1 in the i-th DCT block through the processing written by the formula below.

Formula 7

$$H1(i) = \sum_{x,y \in AR\_H1} AC(x, y, i) \qquad (7)$$

In the above formula, x, y∈AR_H1 indicates frequency component data (x, y) included in the high-frequency area AR_H1. The above formula is used to calculate the sum H1(i) of the integrated values of frequency component data included in the high-frequency area AR_H1.

The noise determination unit 3 sets the value of a flag f_noisy(i), which indicates a noise determination result for the i-th DCT block, based on the low-frequency component sum L1(i) and the high-frequency component sum H1(i) calculated above in the i-th DCT block. The noise determination result flag f_noisy(i) is set to 1 when the result indicates that the image contains noise (or contains much noise), and is set to 0 when the result indicates that the image contains no noise (or a little noise).

More specifically, the noise determination unit 3 sets the noise determination result flag f_noisy(i) to 1 when H1(i)/L1(i)>Th4 and H1(i)>Th5, where Th4 and Th5 are thresholds.

In any other cases, the noise determination unit 3 sets the noise determination result flag f_noisy(i) to 0.

The noise determination unit 3 performs the above process on each of all the DCT blocks (i=1 to N) included in the current frame image F1 (processing target frame image F1). The noise determination unit 3 counts the number of DCT blocks for which f_noisy(i)=1, and substitutes the resulting count number into the count value num_noisy.

When num_noisy>Th_num2, where Th_num2 is a threshold, or specifically when the number of DCT blocks each determined to contain noise (much noise) is greater than the predetermined number Th_num2, the noise determination unit 3 determines that the frame image F1 (current frame image F1) contains noise (much noise), and sets the noise determination result value noisy as noisy=1.

In any other cases, the noise determination unit 3 sets the noise determination result value noisy as noisy=0.

The noise determination result value noisy is set to 1 when the processing target frame image (or the processing target image area) is determined to contain noise (much noise), and is set to 0 when the processing target frame image (or the processing target image area) is determined to contain no noise (or a little noise).

Split Determination Process (Noise Determination Process)

When the noise determination result value noisy is set to 0 through the above process (hereafter referred to as the overall noise determination process), or specifically when the current frame image is determined to contain no noise (a little noise), the noise determination unit 3 may perform a determination process using split image areas described below (hereafter referred to as a split noise determination process). This split noise determination process will be described with reference to FIG. 4.

FIG. 4 is a schematic diagram of nine split image areas R1 to R9 in the current frame image F1 (processing target frame image F1). Although FIG. 4 shows the current frame image F1 as a square image for ease of explanation, its width to height ratio (aspect ratio) of the current frame image F1 may be other than the square ratio.

In the split noise determination process, the noise determination unit 3 performs the noise determination process on each split image area shown in FIG. 4 as a processing target area to obtain the noise determination result value noisy. The nine split image areas R1 to R9 each consist of M DCT blocks.

The noise determination unit 3 uses each of the split image areas R1 to R9 as a processing target area. In the same manner as in the overall noise determination process, the noise determination unit 3 obtains the high-frequency component sum H1(i) and the low-frequency component sum L1(i) in the i-th DCT block.

The noise determination unit 3 sets the value of a flag f_noisy(i), which indicates a noise determination result for the i-th DCT block, based on the low-frequency component sum L1(i) and the high-frequency component sum H1(i) calculated above in the i-th DCT block.

More specifically, the noise determination unit 3 sets the noise determination result flag f_noisy(i) to 1 when H1(i)/L1(i)>Th4 and H1(i)>Th5, where Th4 and Th5 are thresholds.

In any other cases, the noise determination unit 3 sets the noise determination result flag f_noisy(i) to 0.

The noise determination unit 3 performs the above process on each of all the DCT blocks (i=1 to M) included in each of the split image areas R1 to R9. The noise determination unit 3 counts the number of DCT blocks for which f_noisy(i)=1, and substitutes the resulting count number into the count value num_noisy1. When num_noisy1>Th_num3, where Th_num3 is a threshold, or specifically when the number of split image areas each determined to contain noise (much noise) is greater than the predetermined number Th_num3, the noise determination unit 3 determines that the split image area contains noise (much noise), and sets the noise determination result value noisy_d of the split image area as noisy_d=1.

In any other cases, the noise determination unit 3 sets the noise determination result value noisy_d of the split image area as noisy_d=0.

The noise determination result value noisy_d of the split image area is set to 1 when the processing target split image area is determined to contain noise (much noise), and is set to 0 when the processing target split image area is determined to contain no noise (a little noise).

The noise determination unit 3 performs the above process on each of the split image areas R1 to R9, counts the number of split image areas for which the noise determination result value noisy_d of the split image area is 1, and substitutes the resulting count number into the count value num_noisy_d.

When num_noisy_d>Th_num4, where Th_num4 is a threshold, or specifically when the number of split image areas each determined to contain noise (much noise) is greater than the predetermined number Th_num4, the noise determination unit 3 determines that the frame image F1 (current frame image F1) contains noise (much noise), and sets the noise determination result value noisy of the current frame image F1 as noisy=1. The threshold Th_num4 may be set as Th_num4=Th_num2/n1, where n1 is the number of split image areas (n1=9 in the example of FIG. 4).

Through the above processing, the noise determination unit 3 obtains the noise determination result value noisy of the current frame image F1. A signal indicating the noise determination result value noisy of the current frame image F1 obtained by the noise determination unit 3 is output to the code amount adjustment unit 4.

The code amount adjustment unit 4 generates the code amount adjustment signal ADJ based on the complexity cmplx obtained by the complexity obtaining unit 2 and the noise determination result (noise determination result value noisy) obtained by the noise determination unit 3.

A specific process performed by the code amount adjustment unit 4 will now be described with reference to FIG. 6 to FIG. 8.

FIG. 6 is a diagram showing the relationship between the noise determination result and the complexity, and the corresponding QP values.

Figure 7:
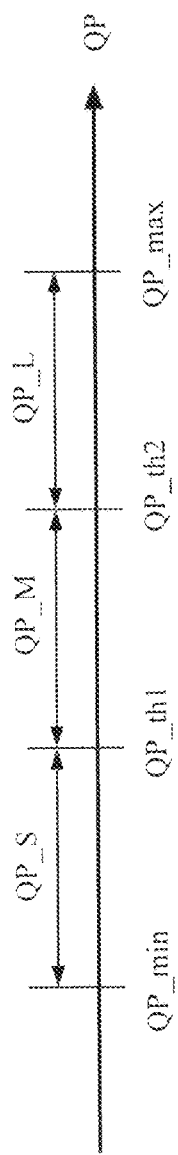
FIG. 7 is a diagram showing split ranges for adjusting the ranges of possible quantization parameter values QP and the quantization parameter values QP.

FIG. 7 is a diagram showing a range of possible quantization parameter values QP and split ranges for adjusting the quantization parameter values QP.

FIG. 8 is a diagram showing the relationship between the noise determination result and the complexity, and the corresponding QP values.

As shown in FIG. 7, the quantization parameter value QP used in the quantization performed by the coding unit 6 will hereafter fall within the range of values satisfying the inequality below:

QP_min≤QP≤QP_max, where QP_min is a minimum QP value, and QP_max is a maximum QP value. As shown in FIG. 7, the split ranges QP_S, QP_M, and QP_L are set for adjusting the quantization parameter value QP. The split ranges QP_S, QP_M, and QP_L are set in the manner below by using the values QP_th1 and QP_th2:

QP_min≤QP<QP_th1 for the set range QP_S,
QP_th1≤QP<QP_th2 for the set range QP_M,
QP_th2≤QP<QP_max for the set range QP_L, and
QP_min<QP_th1<QP_th2<QP_max.

The quantization parameter value QP is a positive value. For example, the quantization parameter value QP is proportional to the logarithm of the quantization step value.

As shown in FIG. 6, the code amount adjustment unit 4 generates a code amount adjustment signal ADJ for adjusting the quantization parameter value QP. More specifically, (1) when the noise determination result value noisy=1 and the complexity cmplx=1, the code amount adjustment unit 4 generates a code amount adjustment signal ADJ for setting a large quantization parameter value (e.g., the QP value included in the split range QP_L in FIG. 7) in the quantization performed by the coding unit 6.

(2) When the noise determination result value noisy=0 and the complexity cmplx=1, the code amount adjustment unit 4 generates a code amount adjustment signal ADJ for setting a medium quantization parameter value (e.g., the QP value included in the split range QP_M in FIG. 7) in the quantization performed by the coding unit 6.

(3) When the noise determination result value noisy=1 and the complexity cmplx=0, the code amount adjustment unit 4 generates a code amount adjustment signal ADJ for setting a medium quantization parameter value (e.g., the QP value included in the split range QP_M in FIG. 7) in the quantization performed by the coding unit 6.

(4) When the noise determination result value noisy=0 and the complexity cmplx=0, the code amount adjustment unit 4 generates a code amount adjustment signal ADJ for setting a small quantization parameter value (e.g., the QP value included in the split range QP_S in FIG. 7) in the quantization performed by the coding unit 6.

The code amount adjustment signal ADJ generated through the above process is output from the code amount adjustment unit 4 to the quantization parameter determination unit 62 of the coding unit 6.

As shown in FIG. 8, the code amount adjustment unit 4 may generate the code amount adjustment signal ADJ in a manner to adjust the quantization parameter value QP. In this case, the code amount adjustment unit 4 stores the noise determination result value noisy obtained by the noise determination unit 3. More specifically, the code amount adjustment unit 4 stores the noise determination result values noisy for the past k frame images (where k is a natural number). The code amount adjustment unit 4 stores the noise determination result value noisy for a frame image previous to the current frame by n frames (n is 0 or a natural number) as the value noisy_past(n). Through the processing (1) or (2) for example, which will be described below, the code amount adjustment unit 4 sets the noise determination result value noisy_term reflecting the results obtained for a predetermined term. More specifically, (1) when at least k2 noise determination results indicate 1, out of the noise determination result values noisy_past(0) to noisy_past(k1−1) of the k1 frame images, which include the current frame and the past (k1−1) frames (where k1 is a natural number of 2 or greater), the code amount adjustment unit 4 sets the noise determination result value noisy_term as noisy_term=1.

In any other cases, the code amount adjustment unit 4 sets the noise determination result value noisy_term as noisy_term=0.

Under the setting of k1=10 and k2=5 in the above example, when at least five frames are determined to contain noise (much noise), out of the past ten frames including the current frame, the code amount adjustment unit 4 determines that the sequential frame images have much noise (video), and sets the noise determination result value noisy_term to 1.

(2) When at least k3 noise determination results indicate 1, out of the noise determination result values noisy_past(0) to noisy_past(k3−1) of the k3 frame images, which include the current frame and the past (k3−1) frames (where k3 is a natural number of 2 or greater), the code amount adjustment unit 4 sets the noise determination result value noisy_term as noisy_term=1.

In any other cases, the code amount adjustment unit 4 sets the noise determination result value noisy_term as noisy_term=0.

Under the setting of k3=3 in the above example, when all the past three frame images including the current frame are determined to contain noise (much noise), the code amount adjustment unit 4 determines that the sequential frame images have much noise (video), and sets the noise determination result value noisy_term to 1.

The code amount adjustment unit 4 generates a code amount adjustment signal ADJ for adjusting the quantization parameter value QP as shown in FIG. 8 by using the noise determination result value noisy_term described above.

More specifically, (1) when the noise determination result value noisy_term=1 and the complexity cmplx=1, the code amount adjustment unit 4 generates a code amount adjustment signal ADJ for setting a large quantization parameter value (e.g., the QP value included in the split range QP_L in FIG. 7) in the quantization performed by the coding unit 6.

(2) When the noise determination result value noisy_term=0 and the complexity cmplx=1, the code amount adjustment unit 4 generates a code amount adjustment signal ADJ for setting a medium quantization parameter value (e.g., the QP value included in the split range QP_M in FIG. 7) in the quantization performed by the coding unit 6.

(3) When the noise determination result value noisy_term=1 and the complexity cmplx=0, the code amount adjustment unit 4 generates a code amount adjustment signal ADJ for setting a medium quantization parameter value (e.g., the QP value included in the split range QP_M in FIG. 7) in the quantization performed by the coding unit 6.

(4) When the noise determination result value noisy_term=0 and the complexity cmplx=0, the code amount adjustment unit 4 generates a code amount adjustment signal ADJ for setting a small quantization parameter value (e.g., the QP value included in the split range QP_S in FIG. 7) in the quantization performed by the coding unit 6.

The code amount adjustment signal ADJ generated through the above process is output from the code amount adjustment unit 4 to the quantization parameter determination unit 62 of the coding unit 6.

The color space conversion unit 5 subjects the input moving image signal Din to color space conversion to generate a signal in the format that can be coded by the coding unit 6. When the input moving image signal Din is a signal defined in the RGB color space and the coding unit 6 processes signals defined in the YCbCr color space, the color space conversion unit 5 converts the input moving image signal Din from a signal defined in the RGB color space to a signal defined in the YCbCr color space. The resulting signal (e.g., a signal in the YCbCr color space) is output to the coding unit 6 as a moving image signal Din1.

When the input moving image signal Din is a signal obtained by an image sensor including a Bayer array of color filters and is a moving image signal including an R-color component signal, a G1-color component signal, a G2-color component signal, and a B-color component signal, the color space conversion unit 5 may subject the moving image signal to camera signal processing including pixel interpolation, gamma correction, and white balance (WB) adjustment. In this case, the color space conversion unit 5 may perform color space conversion on signals defined in the RGB color space resulting from the camera signal processing.

Through the above processing, the moving image signal Din1 obtained by the color space conversion unit 5 is output to the predictive processing unit 611 and the predictive image generation unit 616 of the coding unit 6.

The predictive processing unit 611 obtains a predictive error signal (predictive error image) diff from the moving image signal Din1 (moving image Din1) and the predictive image signal Dmc (predictive image Dmc) output from the predictive image generation unit 616. The obtained predictive error signal (predictive error image) diff is output to the orthogonal transform unit 612.

The orthogonal transform unit 612 performs orthogonal transform of the input predictive error image. The orthogonal transform unit 612 performs, for example, orthogonal transform, such as DCT or integer transform, of the input predictive error image diff in units of macroblocks (e.g., in units of macroblocks each consisting of four by four pixels or eight by eight pixels). The data resulting from the orthogonal transform (frequency component data) is output to the quantization unit 613.

The quantization unit 613 quantizes the frequency component data output from the orthogonal transform unit 612 based on the quantization parameter value QP output from the quantization parameter determination unit 62. The data resulting from the quantization (quantized data) is output to the inverse quantization unit 614 and the variable-length coding unit 618.

The inverse quantization unit 614 inversely quantizes the quantized data output from the quantization unit 613 to obtain frequency component data, which is then output to the inverse orthogonal transform unit 615.

The inverse orthogonal transform unit 615 performs inverse orthogonal transform of the input frequency component data to obtain a predictive error image diff', which is then output to the predictive image generation unit 616.

The predictive image generation unit 616 performs motion estimation and motion compensation by using a reference image stored in the signal storage unit 617 and the moving image Din1 to obtain a predictive image signal Dmc (predictive image Dmc), which is then output to the predictive processing unit 611. The predictive image generation unit 616 adds the predictive image Dmc and the predictive error image diff' together to generate a moving image Din1' (=Dmc+diff'). The generated moving image Din1' (the image Din1' serving as a current frame image) is stored into the storage unit 617. The moving image Din1' (the image Din1' serving as a current frame image) stored in the storage unit 617 is used as a reference image in processing subsequent frames.

The storage unit 617 stores moving image data generated by the predictive image generation unit 616. The data stored in the storage unit 617 is read by the predictive image generation unit 616 as needed.

The variable-length coding unit 618 subjects the input quantized data to a variable-length coding process. The data resulting from the variable-length coding process is output as output data Dout (coded data Dout).

The quantization parameter determination unit 62 determines the quantization parameter value QP based on the target code amount, the output data Dout, the code amount adjustment signal ADJ, and the various sets of data Info output from the coding processing unit 61. The quantization parameter determination unit 62 determines the quantization parameter value QP_tmp based on, for example, the target code amount, the output data Dout, the various sets of data Info (e.g., the sum of absolute transformed differences, or SATD, and a flag Intra/Inter_flag indicating whether a processing target macroblock is an intra macroblock or an inter macroblock), in the same manner as described in, for example, Japanese Patent Application No. 2013-253430.

The quantization parameter determination unit 62 further adjusts the quantization parameter value QP_tmp based on the code amount adjustment signal ADJ output from the code amount adjustment unit 4 to obtain the quantization parameter value QP. More specifically, (1) when the quantization parameter value QP_tmp falls within the range of QP values resulting from the processing in accordance with the code amount adjustment signal ADJ, the quantization parameter determination unit 62 obtains the quantization parameter value QP as QP=QP_tmp.

(2) When the quantization parameter value QP_tmp fails to fall within the range of QP values in accordance with the code amount adjustment signal ADJ, the quantization parameter determination unit 62 obtains the quantization parameter value QP as QP=QP1, where QP1 is a value within the range of QP values in accordance with the code amount adjustment signal ADJ (e.g., the median in the range of QP values in accordance with the code amount adjustment signal ADJ).

When, for example, the range of QP values resulting from the processing in accordance with the code amount adjustment signal ADJ is the split range QP_S shown in FIG. 7, and when the quantization parameter value QP_tmp fails to fall within the split range QP_S, the quantization parameter determination unit 62 sets the quantization parameter value QP to a value within the split range QP_S (e.g., to the median of the split range QP_S).

More specifically, the quantization parameter determination unit 62 adjusts the quantization parameter value QP_tmp in accordance with the code amount adjustment signal ADJ as needed, and obtains the quantization parameter value QP.

The resulting quantization parameter value QP is output to the quantization unit 613.

As described above, the moving image coding apparatus 1000 adjusts the quantization parameter value QP_tmp in accordance with the generated code amount adjustment signal ADJ as needed based on the complexity cmplx of the input moving image Din obtained by the complexity obtaining unit 2 and the noise determination result (the noise determination result value noisy or noisy_term) obtained by the noise determination unit 3, and determines the quantization parameter value QP. As a result, the moving image coding apparatus 1000 sets the quantization parameter value QP to a relatively large value (to a value within the split area QP_L when the complexity cmplx=1, and to a value within the split area QP_M when the complexity cmplx=0) when the input moving image constitutes video with much noise (video with a poor S/N ratio). The moving image coding apparatus 1000 thus approximately reduces the amount of code to be generated for the input moving image constituting video with much noise (video with a poor S/N ratio).

The moving image coding apparatus 1000 can perform efficient moving image compression on video with much noise (video with a poor S/N ratio), and enables appropriate bit rate control (code amount control).

First Modification

A first modification of the first embodiment will now be described.

In the present modification, the components that are the same as in the first embodiment are given the same reference numerals as those components, and will not be described.

A moving image coding apparatus according to this modification has the same structure as the moving image coding apparatus 1000 of the first embodiment. The moving image coding apparatus of the present modification differs from the moving image coding apparatus 1000 of the first embodiment only in the noise determination process performed by the noise determination unit 3. The noise determination process performed by the noise determination unit 3 in the moving image coding apparatus of the present modification will now be described.

The noise determination unit 3 performs the noise determination process based on frequency component data output from the first orthogonal transform unit 1.

The noise determination unit 3 normalizes DCT coefficient data AC(x, y, i) indicating an alternating current component in the i-th DCT block by using a direct current component DC(i). More specifically, the noise determination unit 3 obtains the normalized DCT coefficient data AC(x, y, i) indicating an alternating current component using the formula below:

$$AC(x,y,i)=AC(x,y,i)/DC(i).$$

The noise determination unit 3 performs this process on each of all the DCT blocks included in the single frame image (N DCT blocks).

The noise determination unit 3 adds up the component data with the same frequency (the same positioned DCT coefficient data in each DCT block) included in each of all the DCT blocks included in the single frame image (N blocks). More specifically, the noise determination unit 3 calculates an integrated value Sum_AC(x, y) of pieces of frequency component data (DCT coefficient data pieces) through the processing written by the formula below.

Formula 8

$$\text{Sum\_AC}(x, y) = \sum_{i=1}^{N} \text{AC}(x, y, i) \quad (8)$$

When the DCT block consists of eight by eight pixels, an integrated value Sum_AC of 63 pieces of frequency component data (DCT coefficient data) is obtained.

The noise determination unit 3 obtains the sum L1 of the integrated values Sum_AC(x, y) of the frequency component data included in the low-frequency alternating-current component area AR_L1 (low-frequency area AR_L1). The low-frequency area AR_L1 is, for example, a hatched area shown in FIG. 5 including pieces of frequency component data. In the example of FIG. 5, the low-frequency area AR_L1 includes 14 pieces of frequency component data AC(1, 0) to AC(4, 0), AC(0, 1) to AC(3, 1), AC(0, 2) to AC(2, 2), AC(0, 3) to AC(1, 3), and AC(0, 4).

More specifically, the noise determination unit 3 obtains the sum L1 (low-frequency integrated value) of the integrated values Sum_AC(x, y) of frequency component data included in the low-frequency area AR_L1 through the processing written by the formula below.

Formula 9

$$L1 = \sum_{x,y \in AR\_L1} \text{Sum\_AC}(x, y) \quad (9)$$

In the above formula, x, y∈AR_L1 indicates frequency component data (x, y) included in the low-frequency area AR_L1. The above formula is used to calculate the sum of the integrated values Sum_AC(x, y) of frequency component data included in the low-frequency area AR_L1.

The noise determination unit 3 obtains the sum H1 of the integrated values Sum_AC(x, y) of frequency component data included in the area indicating the high-frequency alternating current component area AR_H1 (high-frequency area AR_H1). The high-frequency area AR_H1 is, for example, an unshaded (white) area at the lower right shown in FIG. 5 including pieces of frequency component data. In the example of FIG. 5, the high-frequency area AR_H1 includes 15 pieces of frequency component data AC(7, 3), AC(6, 4) to AC(7, 4), AC(5, 5) to AC(7, 5), AC(4, 6) to AC(7, 6), and AC(3, 7) to AC(7, 7).

More specifically, the noise determination unit 3 obtains the sum (high-frequency integrated value) H1 of the integrated values Sum_AC(x, y) of frequency component data included in the high-frequency area AR_H1 through the processing written by the formula below.

Formula 10

$$H1 = \sum_{x,y \in AR\_H1} \text{Sum\_AC}(x, y) \quad (10)$$

In the above formula, x, y∈AR_H1 indicates frequency component data (x, y) included in the high-frequency area AR_H1. The above formula is used to calculate the sum H1 of the integrated values Sum_AC(x, y) of frequency component data included in the high-frequency area AR_H1.

The noise determination unit 3 sets the noise determination result value noisy for the current frame image (processing target frame image) based on the calculated low-frequency integrated value L1 and the calculated high-frequency integrated value H1.

More specifically, the noise determination unit 3 sets the noise determination result value noisy to 1 when H1/L1>Th_A1 and H1>Th_A2, where Th_A1 and Th_A2 are thresholds.

In any other cases, the noise determination unit 3 sets the noise determination result value noisy to 0.

The noise determination result value noisy is set to 1 when the processing target frame image (or the processing target image area) is determined to contain noise (much noise), and is set to 0 when the processing target frame image (or the processing target image area) is determined to contain no noise (a little noise).

Split Determination Process (Noise Determination Process) of First Modification

When the noise determination result value noisy is set to 0 through the above process, which is hereafter referred to as the overall noise determination process (first modification), or specifically when the current frame image is determined to contain no noise (a little noise), the noise determination unit 3 may perform a determination process using split image areas described below, which is hereafter referred to as a split noise determination process (first modification). This split noise determination process will be described with reference to FIG. 4.

FIG. 4 is a schematic diagram of nine split image areas R1 to R9 in the current frame image F1 (processing target frame image F1). Although FIG. 4 shows the current frame image F1 as a square image for ease of explanation, its width to height ratio (aspect ratio) of the current frame image F1 may be other than the square ratio.

In the split noise determination process, the noise determination unit 3 performs the noise determination process on each split image area shown in FIG. 4 as a processing target area to obtain the noise determination result value noisy. The nine split image areas R1 to R9 each consist of M DCT blocks.

The noise determination unit 3 uses each of the split image areas R1 to R9 as a processing target area. In the same manner as in the overall noise determination process (first modification), the noise determination unit 3 obtains the high-frequency component sum H1 and the low-frequency component sum L1 in each split image area.

The noise determination unit 3 sets, for each split image area, the noise determination result value noisy_d of the processing target split image area based on the calculated low-frequency integrated value L1 and the calculated high-frequency integrated value H1.

More specifically, the noise determination unit 3 sets the noise determination result value noisy_d for the processing target split image area to 1 when H1/L1>Th_A3 and H1>Th_A4, where Th_A3 and Th_A4 are thresholds.

In any other cases, the noise determination unit 3 sets the noise determination result value noisy_d for the processing target split image area to 0.

The noise determination unit 3 performs the above process on each of the split image areas R1 to R9, counts the number of split image areas for which the noise determination result value noisy_d is 1, and substitutes the resulting count number into the count value num_noisy_d. When num_noisy_d>Th_numA1, where Th_numA1 is a threshold, or specifically when the number of split image areas each determined to contain noise (much noise) is greater than the predetermined number Th_numA1, the noise determination unit 3 determines that the frame image F1 (current frame image F1) contains noise (much noise), and sets the value noisy as noisy=1.

Through the processing described above, the noise determination unit 3 obtains the noise determination result value noisy of the current frame image F1. A signal indicating the noise determination result value noisy of the current frame image F1 obtained by the noise determination unit 3 is then output to the code amount adjustment unit 4.

Except the processing described above, the moving image coding apparatus of the present modification performs the same processing as the moving image coding apparatus 1000 of the first embodiment.

As described above, the moving image coding apparatus of the present modification adjusts the quantization parameter value QP_tmp in accordance with the generated code amount adjustment signal ADJ as needed based on the complexity cmplx of the input moving image Din obtained by the complexity obtaining unit 2 and the noise determination result (noise determination result value noisy, or noisy_term) obtained by the noise determination unit 3 and determines the quantization parameter value QP in the same manner as the moving image coding apparatus 1000 of the first embodiment. The moving image coding apparatus of the present modification sets the quantization parameter value QP to a relatively large value (to a value within the split area QP_L when the complexity cmplx=1, and to a value within the split area QP_M when the complexity cmplx=0) when the input moving image constitutes video with much noise (video with a poor S/N ratio). The moving image coding apparatus of the present modification thus approximately reduces the amount of code to be generated for the input moving image constituting video with much noise (video with a poor S/N ratio).

The moving image coding apparatus of the present modification can perform efficient moving image compression on video with much noise (video with a poor S/N ratio), and enables appropriate bit rate control (code amount control) in the same manner as the moving image coding apparatus 1000 of the first embodiment.

Second Modification

A second modification of the first embodiment will now be described.

In the present modification, the components that are the same as in the first embodiment are given the same reference numerals as those components, and will not be described.

A moving image coding apparatus according to this modification has the same structure as the moving image coding apparatus 1000 of the first embodiment. The moving image coding apparatus of the present modification differs from the moving image coding apparatus 1000 of the first embodiment only in the noise determination process performed by the noise determination unit 3. The noise determination process performed by the noise determination unit 3 in the moving image coding apparatus of the present modification will now be described.

The noise determination unit 3 performs the noise determination process based on frequency component data output from the first orthogonal transform unit 1.

Figure 9:
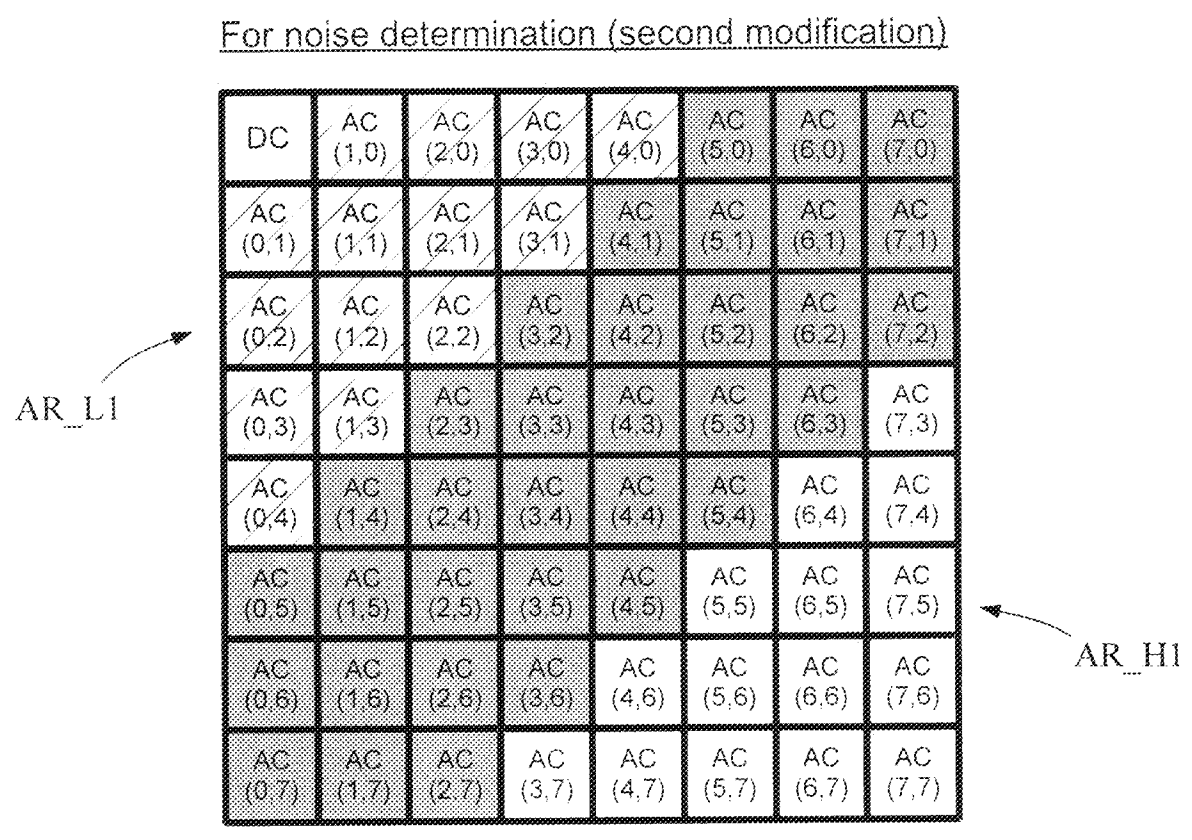
Figure 10:
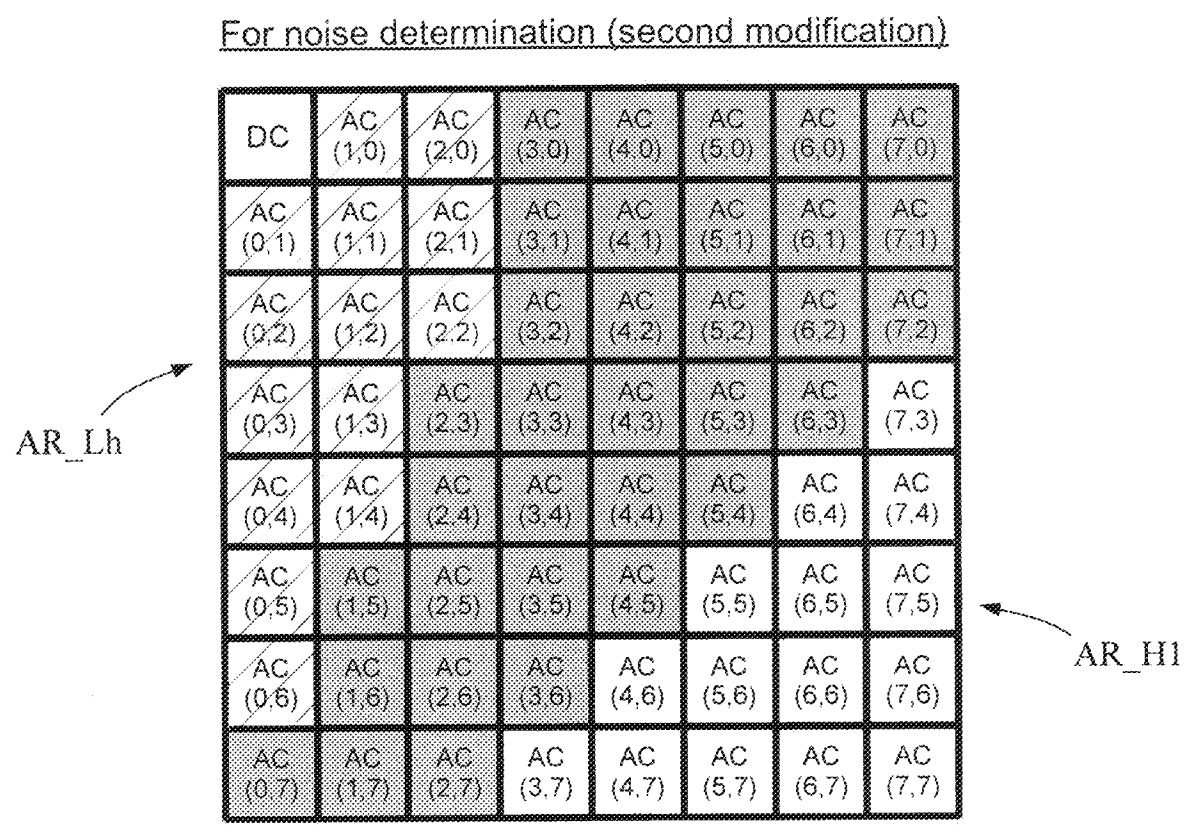

FIGS. 9 to 11 are diagrams each showing a processing target block (DCT block) consisting of eight by eight pixels.

In FIG. 9, pieces of frequency component data (DCT coefficient data) indicated by a hatched area are included in the low-frequency area AR_L1, whereas pieces of frequency component data (DCT coefficient data) indicated by a white area at the lower right are included in the high-frequency area AR_H1.

In FIG. 10, pieces of frequency component data (DCT coefficient data) indicated by a hatched area are included in the low-frequency area AR_Lh, whereas pieces of frequency component data (DCT coefficient data) indicated by a white area at the lower right are included in the high-frequency area AR_H1.

In FIG. 11, pieces of frequency component data (DCT coefficient data) indicated by a hatched area are included in the vertical-frequency area AR_Lv, whereas pieces of frequency component data (DCT coefficient data) indicated by a white area at the lower right are included in the high-frequency area AR_H1.

The noise determination unit 3 normalizes a DCT coefficient data piece AC(x, y, i) indicating an alternating current component in the i-th DCT block by using a direct current component DC(i). More specifically, the noise determination unit 3 obtains the normalized DCT coefficient data piece AC(x, y, i) indicating an alternating current component using the formula below:

$$AC(x,y,i)=AC(x,y,i)/DC(i).$$

The noise determination unit 3 adds up the frequency component data (the same positioned DCT coefficient data in each DCT block) included in the low-frequency area AR_L1 in the i-th DCT block, and obtains the low-frequency component sum L1(i).

More specifically, the noise determination unit 3 obtains the low-frequency component sum L1(i), which is an integrated value of frequency component data included in the low-frequency area AR_L1 in the i-th DCT block through the processing written by the formula below.

Formula 11

$$L1(i) = \sum_{x,y \in AR\_L1} AC(x, y, i) \qquad (11)$$

In the above formula, x, y∈AR_L1 indicates frequency component data (x, y) included in the low-frequency area AR_L1. The above formula is used to calculate the sum L1(i) of the integrated values L1(i) of frequency component data included in the low-frequency area AR_L1.

The noise determination unit 3 adds up the frequency component data (the same positioned DCT coefficient data in each DCT block) included in the horizontal low-frequency area AR_Lh in the i-th DCT block, and obtains the horizontal low-frequency component sum Lh(i).

More specifically, the noise determination unit 3 obtains the horizontal low-frequency component sum Lh(i), which is an integrated value of frequency component data included in the horizontal low-frequency area AR_Lh in the i-th DCT block through the processing written by the formula below.

Formula 12

$$Lh(i) = \sum_{x,y \in AR\_Lh} AC(x, y, i) \qquad (12)$$

In the above formula, x, y∈AR_Lh indicates frequency component data (x, y) included in the horizontal low-frequency area AR_Lh. The above formula is used to calculate the sum Lh(i) of the integrated values of frequency component data included in the horizontal low-frequency area AR_Lh.

The noise determination unit 3 adds up the frequency component data (the same positioned DCT coefficient data in each DCT block) included in the vertical low-frequency area AR_Lv in the i-th DCT block, and obtains the vertical low-frequency component sum Lv(i).

More specifically, the noise determination unit 3 obtains the vertical low-frequency component sum Lv(i), which is an integrated value of frequency component data included in the vertical low-frequency area AR_Lv in the i-th DCT block through the processing written by the formula below.

Formula 13

$$Lv(i) = \sum_{x,y \in AR\_Lv} AC(x, y, i) \qquad (13)$$

In the above formula, x, y∈AR_Lv indicates frequency component data (x, y) included in the vertical low-frequency area AR_Lv. The above formula is used to calculate the sum Lv(i) of vertical low-frequency integrated values of frequency component data included in the vertical low-frequency area AR_Lv.

The noise determination unit 3 adds up the frequency component data (the same positioned DCT coefficient data in each DCT block) included in the high-frequency area AR_H1 in the i-th DCT block, and obtains the high-frequency component sum H1(i).

More specifically, the noise determination unit 3 obtains the high-frequency component sum H1(i), which is an integrated value of frequency component data included in the high-frequency area AR_H1 in the i-th DCT block through the processing written by the formula below.

Formula 14

$$H1(i) = \sum_{x,y \in AR\_H1} AC(x, y, i) \qquad (14)$$

In the above formula, x, y∈AR_H1 indicates frequency component data (x, y) included in the high-frequency area AR_H1. The above formula is used to calculate the sum H1(i) of high-frequency integrated values of frequency component data included in the high-frequency area AR_H1.

The noise determination unit 3 sets the value of a flag f_noisy(i), which indicates a noise determination result for the i-th DCT block, based on the low-frequency component sum L1(i), the horizontal low-frequency component sum Lh(i), the vertical low-frequency component sum Lv(i), and the high-frequency component sum H1(i) calculated above in the i-th DCT block. The noise determination result flag f_noisy(i) is set to 1 when the image is determined to contain noise (much noise), and is set to 0 when the image is determined to contain no noise (a little noise).

More specifically, the noise determination unit 3 sets the noise determination result flag f_noisy(i) to 1 when the conditions 1 to 3 below are all satisfied.

Condition 1: Determining Whether Image Contains Many Edge Components $H1(i)/L1(i) > Th10$, where $Th10$ is a threshold Condition 2: Determining Whether Image Contains Many Horizontal Edge Components $H1(i)/Lh(i) > Th\_h$, where $Th\_h$ is a threshold Condition 3: Determining Whether Image Contains Vertical Edge Components $H1(i)/Lv(i) > Th\_v$, where $Th\_v$ is a threshold Alternatively, the noise determination result flag f_noisy(i) may be set to 1 when any of the conditions 1 to 3 is satisfied. Alternatively, the noise determination result flag f_noisy(i) may be set to 1 when any two of the above conditions 1 to 3 are satisfied.

In any other cases, the noise determination unit 3 sets the noise determination result flag f_noisy(i) to 0.

The noise determination unit 3 may additionally perform an isolated frequency component detection process to detect whether the processing target block contains much noise, and may set the noise determination result flag f_noisy(i) to reflect the detection result.

The isolated frequency component detection process will now be described.

When a natural image is transformed by DCT, the resulting DCT coefficients are likely to distribute continuously from one another. More specifically, when a natural image is transformed by frequency transform, the resulting frequency components (DCT coefficient data) located nearer in the frequency domain tend to be similar. Thus, it is less likely that a specific frequency component (DCT coefficient data) is markedly different from its neighboring frequency components (DCT coefficient data). When a specific frequency component (DCT coefficient data) is markedly different from its neighboring frequency components (DCT coefficient data), the specific frequency component (DCT coefficient data) can be associated with a noise component.

When determining that a DCT block includes many isolated frequency components in the isolated frequency component detection process, the noise determination unit 3 determines that an image area corresponding to the DCT block contains much noise.

More specifically, the noise determination unit 3 obtains the average Ave of DCT coefficient data AC(x, y, i) of an alternating current component normalized by using a direct current component DC(i) in the i-th DCT block.

The noise determination unit 3 performs the isolated frequency component detection process on each piece of DCT coefficient data surrounded by eight neighboring pieces of DCT coefficient data in the DCT block. An 8×8 DCT block includes 36 pieces of DCT coefficient data each surrounded by neighboring eight DCT coefficient data pieces; the 36 pieces of DCT coefficient data are AC(1, 1) to AC(6, 1), AC(1, 2) to AC(6, 2), AC(1, 3) to AC(6, 3), AC(1, 4) to AC(6, 4), AC(1, 5) to AC(6, 5), and AC(1, 6) to AC(6, 6).

For the detection target DCT coefficient data AC(x, y), the noise determination unit 3 determines the DCT coefficient data AC(x, y) as an isolated frequency component when AC(x, y) > Th_20, where Th_20 is a threshold (e.g., Th_20=Ave) and the number of pieces of DCT coefficient data each having the value greater than the average Ave is less than D1, among the eight pieces of DCT coefficient data neighboring the data AC(x, y), which are the DCT coefficient data pieces AC(x−1, y−1), AC(x, y−1), AC(x+1, y−1), AC(x−1, y), AC(x+1, y), AC(x−1, y+1), AC(x, y+1), and AC(x+1, y+1).

The noise determination unit 3 performs the isolated frequency component detection process on each piece of DCT coefficient data surrounded by five neighboring pieces of DCT coefficient data in the DCT block. The 8×8 DCT block includes 24 pieces of DCT coefficient data each surrounded by five neighboring pieces of DCT coefficient data; the 24 pieces of DCT coefficient data are AC(1, 0) to AC(6, 0) (in the row above), AC(0, 1) to AC(0, 6) (in the left column), AC(1, 7) to AC(6, 7) (in the row below), and AC(7, 1) to AC(7, 6).

For the detection target DCT coefficient data AC(x, y), the noise determination unit 3 determines the DCT coefficient data AC(x, y) as an isolated frequency component when AC(x, y)>Th_21, where Th_21 is a threshold and the number of pieces of DCT coefficient data each having the value greater than the average Ave is less than D2, among the five pieces of DCT coefficient data neighboring the data AC(x, y).

When the number of pieces of DCT coefficient data each determined to be an isolated frequency component through the above processing is greater than D3, the noise determination unit 3 determines that the DCT block (image area) includes many isolated frequency components and contains much noise. In this case, the noise determination unit 3 sets the noise determination result flag f_noisy(i) to 1.

The noise determination unit 3 performs the above process on each of all the DCT blocks (I=1 to N) included in the current frame image F1 (processing target frame image F1). The noise determination unit 3 counts the number of DCT blocks for which f_noisy(i)=1, and substitutes the resulting count number into the count value num_noisy3.

When num_noisy3>Th_num22, where Th_num22 is a threshold, or specifically when the number of DCT blocks each determined to contain noise (much noise) is greater than the predetermined number Th_num22, the noise determination unit 3 determines that the frame image F1 (current frame image F1) contains noise (much noise), and sets the noise determination result value noisy as noisy=1.

In any other cases, the noise determination unit 3 sets the noise determination result value noisy as noisy=0.

The noise determination result value noisy is set to 1 when the processing target frame image (or the processing target image area) is determined to contain noise (much noise), and is set to 0 when the processing target frame image (or the processing target image area) contains no noise (a little noise).

Split Determination Process (Noise Determination Process) of Second Modification When the noise determination result value noisy is set to 0 through the above process, which is hereafter referred to as the overall noise determination process (second modification), or specifically when the current frame image is determined to contain no noise (a little noise), the noise determination unit 3 may perform a determination process using split image areas described below, which is hereafter referred to as a split noise determination process (second modification). This split noise determination process will be described with reference to FIG. 4.

FIG. 4 is a schematic diagram of nine split image areas R1 to R9 in the current frame image F1 (processing target frame image F1). Although FIG. 4 shows the current frame image F1 as a square image for ease of explanation, its width to height ratio (aspect ratio) of the current frame image F1 may be other than the square ratio.

In the split noise determination process, the noise determination unit 3 performs a noise determination process on each split image area shown in FIG. 4 as a processing target area to obtain the noise determination result value noisy. The nine split image areas R1 to R9 each consist of M DCT blocks.

The noise determination unit 3 uses each of the split image areas R1 to R9 as a processing target area. In the same manner as in the overall noise determination process (second modification), the noise determination unit 3 obtains the high-frequency component sum H1(i), the low-frequency component sum L1(i), the horizontal low-frequency component sum Lh(i), and the vertical low-frequency component sum Lv(i) in the i-th DCT block.

More specifically, the noise determination unit 3 sets the noise determination result flag f_noisy(i) to 1 when the conditions 1 to 3 are all satisfied.

Condition 1: Determining Whether Image Contains Many Edge Components $H1(i)/L1(i)>Th10$, where $Th10$ is a threshold Condition 2: Determining Whether Image Contains Many Horizontal Edge Components $H1(i)/Lh(i)>Th\_h$, where $Th\_h$ is a threshold Condition 3: Determining Whether Image Contains Vertical Edge Components $H1(i)/Lv(i)>Th\_v$, where $Th\_v$ is a threshold In any other cases, the noise determination unit 3 sets the noise determination result flag f_noisy(i) to 0.

The noise determination unit 3 may additionally perform an isolated frequency component detection process to detect whether the processing target block contains much noise, and may set the noise determination result flag f_noisy(i) to reflect the detection result.

The noise determination unit 3 performs the above process on each of all the DCT blocks (i=1 to M) included in each of the split image area R1 to R9. The noise determination unit 3 counts the number of DCT blocks for which f_noisy(i)=1, and substitutes the resulting count number into the count value num_noisy.

When num_noisy21>Th_num23, where Th_num23 is a threshold, or specifically when the number of DCT blocks each determined to contain noise (much noise) is greater than a predetermined number Th_num23, the noise determination unit 3 determines that the split image area contains noise (much noise), and sets the noise determination result value noisy_d of the split image area as noisy_d=1.

In any other cases, the noise determination unit 3 sets the noise determination result value noisy_d of the split image area as noisy_d=0.

The noise determination result value noisy_d for the split image area is set to 1 when the processing target split image area is determined to contain noise (much noise), and is set to 0 when the processing target split image area is determined to contain no noise (a little noise).

The noise determination unit 3 performs the above process on each of the split image areas R1 to R9, and counts the number of split image areas for which the noise determination result value noisy_d is 1, and substitutes the resulting count number into the count value num_noisy_d.

When num_noisy_d>Th_num23, where Th_num23 is a threshold, or specifically when the number of split image areas each determined to contain noise (much noise) is greater than the predetermined number Th_num23, the noise determination unit 3 determines that the frame image F1 (current frame image F1) contains noise (much noise), and sets the noise determination result value noisy as noisy=1. The threshold Th_num23 may be set as Th_num23=Th_num22/n1, where n1 is the number of split image areas (n1=9 in the example of FIG. 4).

Through the processing described above, the noise determination unit 3 obtains the noise determination result value noisy of the current frame image F1. A signal indicating the noise determination result value noisy of the current frame image F1 obtained by the noise determination unit 3 is output to the code amount adjustment unit 4.

As described above, the moving image coding apparatus of the present modification adjusts the quantization parameter value QP_tmp as needed in accordance with the generated code amount adjustment signal ADJ based on the complexity cmplx of the input moving image Din obtained by the complexity obtaining unit 2 and the noise determination result (noise determination result value noisy, or noisy_term) obtained by the noise determination unit 3 and determines the quantization parameter value QP in the same manner as the moving image coding apparatus 1000 of the first embodiment. The moving image coding apparatus of the present modification sets the quantization parameter value QP to a relatively large value (to a value within the split area QP_L when the complexity cmplx=1, and to a value within the split area QP_M when the complexity cmplx=0) when the input moving image constitutes video with much noise (video with a poor S/N ratio). The moving image coding apparatus of the present modification thus approximately reduces the amount of code to be generated for the input moving image constituting video with much noise (video with a poor S/N ratio).

The moving image coding apparatus of the present modification can perform efficient moving image compression on video with much noise (video with a poor S/N ratio), and enables appropriate bit rate control (code amount control) in the same manner as the moving image coding apparatus 1000 of the first embodiment.

Other Embodiments

Although the above embodiments (including the modification) use DCT transform as an example of orthogonal transform, the orthogonal transform should not be limited to this method, but may be, for example, integer transform, fast Fourier transform (FFT), or wavelet transform.

The frequency components resulting from orthogonal transform appear at different positions in the frequency domain depending on the orthogonal transform employed. The processing target area (e.g., area for integration) of the frequency transform data (frequency component data) used in the complexity obtaining process and/or the noise determination process may be changed in accordance with the orthogonal transform employed.

Although the above embodiments (including the modifications) assume that the input moving image has a picture sequence (frame sequence) of IPPPP . . . , the input moving image may have a picture sequence (frame sequence) including B frames (B pictures). In this case, the coding unit includes a picture rearranging unit at its first stage, which rearranges the pictures (frames) of the input moving image in the order of coding.

When the input moving image contains moving image signals including an R-color component signal, a G1-color component signal, a G2-color component signal, and a B-color component signal, the first orthogonal transform unit 1, the complexity obtaining unit 2, the noise determination unit 3, and the code amount adjustment unit 4 in the above embodiments (including the modifications) may perform processing on any single component signal selected from the R-color component signal, the G1-color component signal, the G2-color component signal, and the B-color component signal, or may be performed on a plurality of or all of these component signals.

Although the above embodiments (including the modifications) describe the case in which the split determination process in the complexity obtaining process and the noise determination process is performed using each of the nine split image areas into which the single frame image is split, the embodiments should not be limited to this structure. The single frame image may be split into a different number of split image areas.

In the above embodiments (including the modifications), the code amount adjustment unit 4 is separate from the quantization parameter determination unit 62. The embodiments should not be limited to this structure. For example, the code amount adjustment unit 4 may be eliminated, and the quantization parameter determination unit 62 may function as the code amount adjustment unit 4.

In the above embodiments (including the modifications), the DCT block includes eight by eight pixels (an image area including eight by eight pixels). The embodiments should not be limited to this structure. The DCT block may have another size, or for example, may be a block including 16 by 16 or 4 by 4 pixels.

In the above embodiments (including the modifications), the areas that undergo the complexity obtaining process are the low-frequency area AR_L, the medium-frequency area AR_M, and the high-frequency area AR_H shown in FIG. 3. The embodiments should not be limited to this structure. The low-frequency area AR_L, the medium-frequency area AR_M, and the high-frequency area AR_H may also be set differently from the areas shown in FIG. 3.

In the above embodiments (including the modifications), the areas that undergo the noise determination process are the low-frequency area AR_L1 and the high-frequency area AR_H1 shown in FIG. 5. The embodiments should not be limited to this structure. The low-frequency area AR_L1 and the high-frequency area AR_H1 may also be set differently from the areas shown in FIG. 5. For example, the average luminance of the current frame image (processing target image) may be used to change the size of the low-frequency area AR_L1 and/or the high-frequency area AR_H1.

In the above embodiments (including the modifications), the areas that undergo the noise determination process are the low-frequency area AR_L1, the horizontal low-frequency area AR_Lh, the vertical low-frequency area AR_Lv, and the high-frequency area AR_H1 shown in FIGS. 9 to 11. The embodiments should not be limited to this structure. The low-frequency area AR_L1, the horizontal low-frequency area AR_Lh, the vertical low-frequency area AR_Lv, and the high-frequency area AR_H1 may also be set differently from the areas shown in FIGS. 9 to 11. For example, the average luminance of the current frame image (processing target image) may be used to change the size of the low-frequency area AR_L1, the horizontal low-frequency area AR_Lh, the vertical low-frequency area AR_Lv, and the high-frequency area AR_H1.

In the above embodiments (including the modifications), the low-frequency integrated value Sum_L, the low-frequency component sum L1(i), the low-frequency integrated value L1, the horizontal low-frequency component sum Lh(i), and the vertical low-frequency component sum Lv(i) are calculated by using integration excluding DC components. The embodiments should not be limited to this structure. The above values may be calculated by using integration including the normalized DC components (normalized using DC components).

In the above embodiments (including the modifications), the process using the split image areas uses the current frame image F1 (processing target frame image F1) including the nine split image areas R1 to R9, each of which consists of M DCT blocks as shown in FIG. 4. The embodiments should not be limited to this structure. Each split image area may include the number of DCT blocks different from the above specified number, or may have the size or the shape different from the above size or shape.

The above embodiments and modifications may be either partially or entirely combined with one another.

The moving image coding apparatus according to each of the above embodiments may be either partially or entirely formed by using an integrated circuit (e.g., LSI or system LSI).

Some or all of the functional blocks described in the above embodiments may be implemented using programs. All or part of the processes performed by the functional blocks described in the above embodiments may be implemented by a central processing unit (CPU) in a computer. The programs for these processes may be stored in a storage device, such as a hard disk or a ROM, and may be executed from the ROM or be read into a RAM and then executed.

The processes described in the above embodiments may be implemented by using either hardware or software (including use of an operating system (OS), middleware, or a predetermined library), or may be implemented using both software and hardware. When the moving image coding apparatus of each of the above embodiments is implemented by hardware, the apparatus needs timing adjustment for its processes. For ease of explanation, the timing adjustment associated with various signals used in an actual hardware design is not described in detail in the above embodiments.

The processes described in the above embodiments may not be performed in the order specified in the above embodiments. The order in which the processes are performed may be changed without departing from the scope and the spirit of the invention.

The present invention may also include a computer program enabling a computer to implement the method described in the above embodiments and a computer readable recording medium on which such a program is recorded. The computer readable recording medium may be, for example, a flexible disk, a hard disk, a CD-ROM, an MO, a DVD, a DVD-ROM, a DVD-RAM, a large-capacity DVD, a next-generation DVD, or a semiconductor memory.

The computer program may not be recorded on the recording medium but may be transmitted with an electric communication line, a radio or cable communication line, or a network such as the Internet.

The term "unit" herein may include "circuitry," which may be partly or entirely implemented by using either hardware or software, or both hardware and software.

The specific structures described in the above embodiments of the present invention are mere examples, and may be changed and modified variously without departing from the scope and the spirit of the invention.

APPENDIXES

The present invention may also be expressed in the following forms.

A first aspect of the invention provides a moving image coding apparatus including a first orthogonal transform unit, a complexity obtaining unit, a noise determination unit, a code amount adjustment unit, and a coding unit.

The first orthogonal transform unit performs orthogonal transform of an input moving image including a plurality of frame images.

The complexity obtaining unit obtains a complexity of the input moving image based on frequency component data obtained through the orthogonal transform performed by the first orthogonal transform unit.

The noise determination unit determines noise contained in the input moving image based on the frequency component data obtained through the orthogonal transform performed by the first orthogonal transform unit.

The code amount adjustment unit generates a code amount adjustment signal based on the complexity obtained by the complexity obtaining unit and a result of the noise determination performed by the noise determination unit.

The coding unit subjects the input moving image to a coding process including quantization. The coding unit performs the quantization using a quantization parameter value determined based on the code amount adjustment signal generated by the code amount adjustment unit.

This moving image coding apparatus determines the quantization parameter value using the code amount adjustment signal ADJ generated based on the complexity of the input moving image obtained by the complexity obtaining unit and the result of the noise determination performed by the noise determination unit. This moving image coding apparatus can determine the condition (state) of the input moving image before performing the coding process. This moving image coding apparatus can set, for example, the quantization parameter value QP to a relatively large value when the input moving image constitutes video with much noise (video with a poor S/N ratio). As a result, this moving image coding apparatus can appropriately reduce the amount of code to be generated for the input moving image constituting video with much noise (video with a poor S/N ratio).

This moving image coding apparatus performs efficient moving image compression on video with much noise (with a poor S/N ratio), and enables appropriate bit rate control (code amount control).

A second aspect of the invention provides the moving image coding apparatus of the first aspect of the invention in which the complexity obtaining unit sets a low-frequency area including low frequency component data, a medium-frequency area including medium frequency component data, and a high-frequency area including high frequency component data in a frequency domain obtained through the orthogonal transform performed by the first orthogonal transform unit, and obtains a low-frequency integrated value by adding up the low frequency component data included in the low-frequency area in a current frame image that is a processing target.

Further, the complexity obtaining unit obtains a medium-frequency integrated value by adding up the medium frequency component data included in the medium-frequency area in the current frame image, and a high-frequency integrated value by adding up the high frequency component data included in the high-frequency area in the current frame image.

Further, the complexity obtaining unit obtains the complexity of the current frame image based on the low-frequency integrated value, the medium-frequency integrated value, and the high-frequency integrated value.

This moving image coding apparatus obtains the complexity of the current frame image in an appropriate manner based on the low-frequency integrated value, the medium-frequency integrated value, and the high-frequency integrated value. For example, the moving image coding apparatus can determine whether the current frame image is complex in an appropriate manner based on the proportion of the medium-frequency integrated value to all the frequency components, or the proportion of the high-frequency integrated value and the medium-frequency integrated value to all the frequency components, and obtains the complexity in an appropriate manner.

The high-frequency area refers to an area including data (block) indicating a spatial frequency component with the largest spatial frequency and at least one piece of data (block) located adjacent to the data (block) indicating the spatial frequency component with the largest spatial frequency in the frequency domain.

The medium-frequency area refers to an area including data (block) indicating a spatial frequency component with a medium spatial frequency value and at least one piece of data (block) located adjacent to the data (block) indicating the spatial frequency component with the medium spatial frequency value in the frequency domain.

The low-frequency area refers to an area including data (block) indicating a DC component (direct current component) and at least one piece of data (block) located adjacent to the data (block) indicating the DC component in the frequency domain.

A third aspect of the invention provides the moving image coding apparatus of the first or second aspect of the invention in which the noise determination unit sets, for an orthogonal transform block that is a unit in which the orthogonal transform is performed by the first orthogonal transform unit, a low-frequency area for noise determination including low frequency component data obtained through the orthogonal transform and a high-frequency area for noise determination including high frequency component data obtained through the orthogonal transform, and obtains, for each orthogonal transform block, a low-frequency integrated value for noise determination by adding up the low frequency component data included in the noise determination low-frequency area.

The noise determination unit obtains, for each orthogonal transform block, a high-frequency integrated value for noise determination by adding up the high frequency component data included in the high-frequency area, and performs a block-by-block noise determination process for determining whether an image block that is yet to undergo orthogonal transform corresponding to the orthogonal transform block contains much noise based on the noise determination low-frequency integrated value and the noise determination high-frequency integrated value.

The noise determination unit performs an overall image determination process for determining that the current frame image contains much noise when the number of orthogonal transform blocks each determined to contain much noise in the block-by-block noise determination process performed on the orthogonal transform block included in the processing target current frame image is greater than a predetermined value TH1.

This moving image coding apparatus can determine the condition of noise in an image block (image area) corresponding to each orthogonal transform block (e.g., each DCT block) based on the noise determination low-frequency integrated value and the noise determination high-frequency integrated value obtained for the orthogonal transform block (e.g., DCT block). When determining that the number of orthogonal transform blocks (the number of image blocks) each determined to contain much noise is greater than a predetermined number, the apparatus determines that the current frame image contains much noise. More specifically, this moving image coding apparatus determines the condition of noise in the current frame image based on data resulting from the frequency transform, and thus can determine whether the current frame image contains much noise far more precisely than when, for example, the determination as to whether the image contains much noise is performed by spatial processing, such as processing using a spatial filter.

A fourth aspect of the invention provides the moving image coding apparatus of the third aspect of the invention in which the noise determination unit determines that the image block that is yet to undergo orthogonal transform corresponding to the orthogonal transform block contains much noise when the noise determination high-frequency integrated value is greater than a predetermined value in the block-by-block noise determination process.

This moving image coding apparatus can determine whether the current frame image contains much noise more precisely. Determining the condition of noise in the current frame image by using the proportion of the noise determination low-frequency integrated value and the noise determination high-frequency integrated value can be erroneous when, for example, the image is mostly formed by DC components and contains only a small proportion of high-frequency components. In contrast, this moving image coding apparatus uses the noise determination high-frequency integrated value, and thus reduces erroneous determination in the above case, and can determine whether the current frame image contains much noise in an appropriate manner.

A fifth aspect of the invention provides the moving image coding apparatus of the third or fourth aspect of the invention in which the noise determination unit performs the block-by-block noise determination process for a split image area that is one of N split image areas into which the current frame image is split (N is a natural number not less than 2) when determining that the current frame image does not contain much noise in the overall image determination process, and performs a split determination process for determining that the split image area contains much noise when the number of orthogonal transform blocks each determined to contain much noise is greater than a predetermined value TH2.

Further, the noise determination unit determines that the current frame image contains much noise when the number of split image areas determined to contain much noise in the split determination process performed on each of the N split image areas (N is a natural number not less than 2) is greater than a predetermined number TH3.

This moving image coding apparatus additionally performs the split determination process when determining that the current frame image does not contain much noise in the overall image determination process, and thus determines whether the current frame image contains much noise more precisely.

A sixth aspect of the invention provides the moving image coding apparatus of the first or second aspect of the invention in which the noise determination unit sets a low-frequency area for noise determination including low frequency component data obtained through the orthogonal transform, and a high-frequency area for noise determination including high frequency component data obtained through the orthogonal transform in a frequency domain obtained through the orthogonal transform performed by the first orthogonal transform unit.

Further, the noise determination unit obtains a low-frequency integrated value for noise determination by adding up the low frequency component data included in the noise determination low-frequency area in a current frame image that is a processing target, and obtains a high-frequency integrated value for noise determination by adding up the high frequency component data included in the high-frequency area in the current frame image.

The noise determination unit performs an overall image determination process for determining whether the current frame image contains much noise based on the noise determination low-frequency integrated value and the noise determination high-frequency integrated value.

This moving image coding apparatus determines the condition of noise in the current frame image in units of frame images (in the overall screen) based on the noise determination low-frequency integrated value and the noise determination high-frequency integrated value. More specifically, this moving image coding apparatus determines the condition of noise in the current frame image based on data resulting from the frequency transform, and thus can determine whether the current frame image contains much noise far more precisely than when, for example, the determination as to whether the image contains much noise is performed by spatial processing, such as processing using a spatial filter.

A seventh aspect of the invention provides the moving image coding apparatus of the sixth aspect of the invention in which the noise determination unit determines that the current frame image contains much noise when the noise determination high-frequency integrated value is greater than a predetermined value in the overall screen noise determination process.

This moving image coding apparatus can determine whether the current frame image contains much noise more precisely. Determining the condition of noise in the current frame image by using the proportion of the noise determination low-frequency integrated value and the noise determination high-frequency integrated value may be erroneous when, for example, the image is mostly formed by DC components and contains only a small proportion of high-frequency components. In contrast, this moving image coding apparatus uses the noise determination high-frequency integrated value, and thus reduces erroneous determination in the above case, and can determine whether the current frame image contains much noise in an appropriate manner.

An eighth aspect of the invention provides the moving image coding apparatus of the sixth or seventh aspect of the invention in which when determining that the current frame image does not contain much noise in the overall image determination process, the noise determination unit obtains a low-frequency integrated value for noise determination by adding up the low frequency component data included in the noise determination low-frequency area, and a high-frequency integrated value for noise determination by adding up the high frequency component data included in the high-frequency area in a split image area that is one of N split image areas into which the current frame image is split (N is a natural number not less than 2).

The noise determination unit determines whether each split image area contains noise based on the noise determination low-frequency integrated value and the noise determination high-frequency integrated value, and determines that the current frame image contains much noise when the number of split image areas each determined to contain much noise is greater than a predetermined number TH4.

This moving image coding apparatus additionally performs the split determination process (the determination process in units of split image areas) when determining that the current frame image does not contain much noise in the overall image determination process, and thus determines whether the current frame image contains much noise more precisely.

A ninth aspect of the invention provides the moving image coding apparatus of the first or second aspect of the invention in which the noise determination unit sets, for an orthogonal transform block that is a unit in which the orthogonal transform is performed by the first orthogonal transform unit, a low-frequency area for noise determination including low frequency component data obtained through the orthogonal transform, a horizontal low-frequency area for noise determination including horizontal low frequency component data obtained through the orthogonal transform, a vertical low-frequency area for noise determination including vertical low frequency component data obtained through the orthogonal transform, and a high-frequency area for noise determination including high frequency component data obtained through the orthogonal transform.

The noise determination unit obtains, for each orthogonal transform block, a low-frequency integrated value for noise determination by adding up the low frequency component data included in the noise determination low-frequency area, and obtains, for each orthogonal transform block, a horizontal low-frequency integrated value for noise determination by adding up the horizontal low frequency component data included in the noise determination horizontal low-frequency area for the orthogonal transform block.

The noise determination unit obtains, for each orthogonal transform block, a vertical low-frequency integrated value for noise determination by adding up the vertical low frequency component data included in the noise determination vertical low-frequency area for the orthogonal transform block, and obtains, for each orthogonal transform block, a high-frequency integrated value for noise determination by adding up the high frequency component data included in the noise determination high-frequency area for the orthogonal transform block.

The noise determination unit performs a block-by-block noise determination process for determining whether an image block that is yet to undergo orthogonal transform corresponding to the orthogonal transform block contains much noise based on the noise determination low-frequency integrated value, the noise determination horizontal low-frequency integrated value, the noise determination vertical low-frequency integrated value, and the noise determination high-frequency integrated value, and performs an overall image determination process for determining that a current frame image that is a processing target contains much noise when the number of orthogonal transform blocks each determined to contain much noise in the block-by-block noise determination process performed on the orthogonal transform block included in the current frame image is greater than a predetermined value TH5.

This moving image coding apparatus determines, for each orthogonal transform block (e.g., each DCT block), the condition of noise in the image block (image area) corresponding to the orthogonal transform block (e.g., DCT block) based on the noise determination low-frequency integrated value, the noise determination horizontal low-frequency integrated value, the noise determination vertical low-frequency integrated value, and the noise determination high-frequency integrated value. When the number of orthogonal transform blocks (the number of image blocks)

each determined to contain much noise is greater than a predetermined number, the moving image coding apparatus determines that the current frame image contains much noise. More specifically, this moving image coding apparatus determines the condition of noise in the current frame image based on data resulting from the frequency transform, and thus can determine whether the current frame image contains much noise far more precisely than when, for example, the determination as to whether the image contains much noise is performed by spatial processing, such as processing using a spatial filter.

This moving image coding apparatus performs the determination process using the noise determination horizontal low-frequency integrated value and the noise determination vertical low-frequency integrated value. Thus, this moving image coding apparatus reduces erroneous determination of images with many horizontal edge components or vertical edge components, and enables the noise determination process to be performed more precisely.

A tenth aspect of the invention provides the moving image coding apparatus of the ninth aspect of the invention in which when determining that the current frame image does not contain much noise in the overall image determination process, the noise determination unit performs the block-by-block noise determination process for a split image area that is one of N split image areas into which the current frame image is split (N is a natural number not less than 2), and performs a split determination process for determining that the split image area contains much noise when the number of orthogonal transform blocks each determined to contain much noise is greater than a predetermined value TH6.

The noise determination unit determines that the current frame image contains much noise when the number of split image areas each determined to contain much noise in the split determination process performed on each of the N split image areas (N is a natural number not less than 2) is greater than a predetermined number TH7.

This moving image coding apparatus additionally performs the split determination process (the determination process in units of split image areas) when determining that the current frame image does not contain much noise in the overall image determination process, and thus determines whether the current frame image contains much noise more precisely.

An eleventh aspect of the invention provides the moving image coding apparatus of one of the third to tenth aspects of the invention in which in the block-by-block noise determination process, the noise determination unit detects, for each orthogonal transform block, the number of pieces of frequency component data each having a level much greater than a level of a neighboring piece of frequency component data as the number of isolated pieces of frequency component data, and determines that an image block that is yet to undergo orthogonal transform corresponding to the orthogonal transform block contains much noise when the detected number of isolated pieces of frequency component data is greater than a predetermined value TH8.

This moving image coding apparatus detects isolated frequency component data in an appropriate manner, and thus appropriately determines noise components appearing in a frequency domain as isolated frequency component data. As a result, this moving image coding apparatus can determine whether the current frame image contains much noise more precisely.

A twelfth aspect of the invention provides the moving image coding apparatus of one of the first to eleventh aspects of the invention in which the coding unit sets a quantization parameter small area QP_S, a quantization parameter medium area QP_M, and a quantization parameter large area QP_L in the manner below:

QP_min≤QP<QP_th1 for the quantization parameter small area QP_S,

QP_th1≤QP<QP_th2 for the quantization parameter medium area QP_M, and

QP_th2≤QP<QP_max for the quantization parameter large area QP_L, where QP_min is a possible minimum value of a quantization parameter value QP, QP_max is a possible maximum value of the quantization parameter value QP, and QP_th1 and QP_th2 are thresholds, and QP_min<QP_th1<QP_th2<QP_max.

The code amount adjustment unit (1) generates the code amount adjustment signal instructing the coding unit to set the quantization parameter value used in the quantization to a value included in the quantization parameter large area QP_L when the current frame image is determined to be complex based on the complexity of the current frame image obtained by the complexity obtaining unit and is determined to contain much noise based on the result of the noise determination performed by the noise determination unit, (2) generates the code amount adjustment signal instructing the coding unit to set the quantization parameter value used in the quantization to a value included in the quantization parameter medium area QP_M when the current frame image is determined to be complex based on the complexity of the current frame image obtained by the complexity obtaining unit and is determined not to contain containing much noise based on the result of the noise determination performed by the noise determination unit, (3) generates the code amount adjustment signal instructing the coding unit to set the quantization parameter value used in the quantization to a value included in the quantization parameter medium area QP_M when the current frame image is determined not to be complex based on the complexity of the current frame image obtained by the complexity obtaining unit and is determined to contain much noise based on the result of the noise determination performed by the noise determination unit, and (4) generates the code amount adjustment signal instructing the coding unit to set the quantization parameter value used in the quantization to a value included in the quantization parameter small area QP_S when the current frame image is determined not to be complex based on the complexity of the current frame image obtained by the complexity obtaining unit and is determined not to contain much noise based on the result of the noise determination performed by the noise determination unit.

This moving image coding apparatus can set, for example, the quantization parameter value QP to a relatively large value (to a value included in the quantization parameter large area QP_L when the input moving image constitutes video with much noise (video with a poor S/N ratio), and to a value included in the quantization parameter medium area QP_M when the complexity is low) when the complexity is low. As a result, this moving image coding apparatus can appropriately reduce the amount of code to be generated for the input moving image constituting video with much noise (video with a poor S/N ratio).

This moving image coding apparatus performs efficient moving image compression on video with much noise (with a poor S/N ratio), and enables appropriate bit rate control (code amount control).

A thirteenth aspect of the invention provides a moving image coding method including a first orthogonal transform step, a complexity obtaining step, a noise determination step, a code amount adjustment step, and a coding step.

In the first orthogonal transform step, orthogonal transform of an input moving image including a plurality of frame images is performed.

In the complexity obtaining step, a complexity of the input moving image is obtained based on frequency component data obtained through the orthogonal transform performed in the first orthogonal transform step.

In the noise determination step, noise contained in the input moving image is determined based on the frequency component data obtained through the orthogonal transform performed in the first orthogonal transform step.

In the code amount adjustment step, a code amount adjustment signal is generated based on the complexity obtained in the complexity obtaining step and a result of the noise determination performed in the noise determination step.

In the coding step, the input moving image is subjected to a coding process including quantization. The coding step performs the quantization using a quantization parameter value determined based on the code amount adjustment signal generated in the code amount adjustment step.

The moving image coding method has the same advantageous effects as the moving image coding apparatus of the first aspect of the present invention.

A fourteenth aspect of the invention provides a computer readable storage medium storing a program enabling a computer to implement the moving image coding method of the thirteenth aspect of the invention.

The computer readable storage medium storing a program enabling a computer to implement the moving image coding method has the same advantageous effects as the moving image coding apparatus of the first aspect of the present invention.

A fifteenth aspect of the invention provides an integrated circuit including a first orthogonal transform unit, a complexity obtaining unit, a noise determination unit, a code amount adjustment unit, and a coding unit.

The first orthogonal transform unit performs orthogonal transform of an input moving image including a plurality of frame images.

The complexity obtaining unit obtains a complexity of the input moving image based on frequency component data obtained through the orthogonal transform performed by the first orthogonal transform unit.

The noise determination unit determines noise contained in the input moving image based on the frequency component data obtained through the orthogonal transform performed by the first orthogonal transform unit.

The code amount adjustment unit generates a code amount adjustment signal based on the complexity obtained by the complexity obtaining unit and a result of the noise determination performed by the noise determination unit.

The coding unit subjects the input moving image to a coding process including quantization. The coding unit performs the quantization using a quantization parameter value determined based on the code amount adjustment signal generated by the code amount adjustment unit.

The integrated circuit has the same advantageous effects as the moving image coding apparatus of the first aspect of the present invention.

What is claimed is:

1. A moving image coding apparatus, comprising:
   first orthogonal transform circuitry configured to perform orthogonal transform of an input moving image including a plurality of frame images;
   complexity obtaining circuitry configured to obtain a complexity of the input moving image based on frequency component data obtained through the orthogonal transform performed by the first orthogonal transform circuitry;
   noise determination circuitry configured to determine, prior to quantization, noise contained in the input moving image based on the frequency component data obtained through the orthogonal transform performed by the first orthogonal transform circuitry;
   code amount adjustment circuitry configured to generate a code amount adjustment signal based on the complexity obtained by the complexity obtaining circuitry and a result of the noise determination performed by the noise determination circuitry; and
   coding circuitry configured to subject the input moving image to a coding process including the quantization, the coding circuitry being configured to perform the quantization using a quantization parameter value determined based on the code amount adjustment signal generated by the code amount adjustment circuitry, wherein the coding circuitry sets a plurality of quantization parameter areas, which are used for determining a quantization parameter value, based on a minimum value of a quantization parameter value, a maximum value of the quantization parameter value, a first threshold value of the quantization parameter value, and a second threshold value of the quantization parameter value.

2. The moving image coding apparatus according to claim 1, wherein
   the complexity obtaining circuitry
   sets a low-frequency area including low frequency component data, a medium-frequency area including medium frequency component data, and a high-frequency area including high frequency component data in a frequency domain obtained through the orthogonal transform performed by the first orthogonal transform circuitry,
   obtains a low-frequency integrated value by adding up the low frequency component data included in the low-frequency area in a current frame image that is a processing target, a medium-frequency integrated value by adding up the medium frequency component data included in the medium-frequency area in the current frame image, and a high-frequency integrated value by adding up the high frequency component data included in the high-frequency area in the current frame image, and
   obtains the complexity of the current frame image based on the low-frequency integrated value, the medium-frequency integrated value, and the high-frequency integrated value.

3. The moving image coding apparatus according to claim 1, wherein
   the noise determination circuitry
   sets, for an orthogonal transform block that is a unit in which the orthogonal transform is performed by the first orthogonal transform circuitry, a low-frequency area for noise determination including low frequency component data obtained through the orthogonal transform and a high-frequency area for noise determination including high frequency component data obtained through the orthogonal transform,
   obtains, for each orthogonal transform block, a low-frequency integrated value for noise determination by adding up the low frequency component data included in the low-frequency area for the noise determination, obtains, for each orthogonal transform block, a high-frequency integrated value for noise determination by adding up the high frequency component data included in the high-frequency area, performs a block-by-block noise determination process for determining whether an image block that is yet to undergo orthogonal transform corresponding to the orthogonal transform block contains noise based on the low-frequency integrated value and the high-frequency integrated value, and performs an overall image determination process for determining that the current frame image contains noise when a number of orthogonal transform blocks each determined to contain noise in the block-by-block noise determination process performed on the orthogonal transform block included in the current frame image, which is the processing target, is greater than a predetermined value TH1.

4. The moving image coding apparatus according to claim 3, wherein the noise determination circuitry determines that the image block that is yet to undergo orthogonal transform corresponding to the orthogonal transform block contains noise when the high-frequency integrated value is greater than a predetermined value in the block-by-block noise determination process.

5. The moving image coding apparatus according to claim 3, wherein the noise determination circuitry performs the block-by-block noise determination process for a split image area that is one of N split image areas into which the current frame image is split, where N is a natural number not less than 2, when determining that the current frame image does not contain noise in the overall image determination process, and performs a split determination process for determining that the split image area contains noise when the number of orthogonal transform blocks each determined to contain noise is greater than a predetermined value TH2, and determines that the current frame image contains noise when a number of split image areas determined to contain noise in the split determination process performed on each of the N split image areas, where N is a natural number not less than 2, is greater than a predetermined number TH3.

6. The moving image coding apparatus according to claim 1, wherein the noise determination circuitry sets a low-frequency area for noise determination including low frequency component data obtained through the orthogonal transform, and a high-frequency area for noise determination including high frequency component data obtained through the orthogonal transform in a frequency domain obtained through the orthogonal transform performed by the first orthogonal transform circuitry, obtains a low-frequency integrated value for noise determination by adding up the low frequency component data included in the low-frequency area in a current frame image that is a processing target, obtains a high-frequency integrated value for noise determination by adding up the high frequency component data included in the high-frequency area in the current frame image, and performs an overall image determination process for determining whether the current frame image contains noise based on the low-frequency integrated value and the high-frequency integrated value.

7. The moving image coding apparatus according to claim 6, wherein the noise determination circuitry determines that the current frame image contains noise when the high-frequency integrated value is greater than a predetermined value in an overall image determination process.

8. The moving image coding apparatus according to claim 6, wherein when determining that the current frame image does not contain noise in the overall image determination process, the noise determination circuitry obtains a low-frequency integrated value for noise determination by adding up the low frequency component data included in the low-frequency area, and a high-frequency integrated value for noise determination by adding up the high frequency component data included in the high-frequency area in a split image area that is one of N split image areas into which the current frame image is split, where N is a natural number not less than 2, determines whether each split image area contains noise based on the low-frequency integrated value and the high-frequency integrated value, and determines that the current frame image contains noise when a number of split image areas each determined to contain noise is greater than a predetermined number TH4.

9. The moving image coding apparatus according to claim 1, wherein the noise determination circuitry sets, for an orthogonal transform block that is a unit in which the orthogonal transform is performed by the first orthogonal transform circuitry, a low-frequency area for noise determination including low frequency component data obtained through the orthogonal transform, a horizontal low-frequency area for noise determination including horizontal low frequency component data obtained through the orthogonal transform, a vertical low-frequency area for noise determination including vertical low frequency component data obtained through the orthogonal transform, and a high-frequency area for noise determination including high frequency component data obtained through the orthogonal transform, obtains, for each orthogonal transform block, a low-frequency integrated value for noise determination by adding up the low frequency component data included in the low-frequency area, obtains, for each orthogonal transform block, a horizontal low-frequency integrated value for noise determination by adding up the horizontal low frequency component data included in the horizontal low-frequency area for the orthogonal transform block, obtains, for each orthogonal transform block, a vertical low-frequency integrated value for noise determination by adding up the vertical low frequency component data included in the vertical low-frequency area for the orthogonal transform block, obtains, for each orthogonal transform block, a high-frequency integrated value for noise determination by adding up the high frequency component data included in the high-frequency area for the orthogonal transform block, performs a block-by-block noise determination process for determining whether an image block that is yet to undergo orthogonal transform corresponding to the orthogonal transform block contains noise based on the low-frequency integrated value, the horizontal low-frequency integrated value, the vertical low-frequency integrated value, and the high-frequency integrated value, and performs an overall image determination process for determining that a current frame image that is a processing target contains noise when a number of orthogonal transform blocks each determined to contain noise in the block-by-block noise determination process performed on the orthogonal transform block included in the current frame image is greater than a predetermined value TH5.

10. The moving image coding apparatus according to claim 9, wherein when determining that the current frame image does not contain noise in the overall image determination process, the noise determination circuitry performs the block-by-block noise determination process for a split image area that is one of N split image areas into which the current frame image is split, where N is a natural number not less than 2, and performs a split determination process for determining that the split image area contains noise when a number of orthogonal transform blocks each determined to contain noise is greater than a predetermined value TH6, and determines that the current frame image contains noise when a number of split image areas each determined to contain noise in the split determination process performed on each of the N split image areas, where N is a natural number not less than 2, is greater than a predetermined number TH7.

11. The moving image coding apparatus according to claim 3, wherein in the block-by-block noise determination process, the noise determination circuitry detects, for each orthogonal transform block, a number of pieces of frequency component data each having a level much greater than a level of a neighboring piece of frequency component data as a number of isolated pieces of frequency component data, and determines that an image block that is yet to undergo orthogonal transform corresponding to the orthogonal transform block contains noise when the detected number of isolated pieces of frequency component data is greater than a predetermined value TH8.

12. The moving image coding apparatus according to claim 1, wherein the coding circuitry sets a quantization parameter small area QP_S, a quantization parameter medium area QP_M, and a quantization parameter large area QP_L in a manner below:

$QP\_min \leq QP < QP\_th1$ for the quantization parameter small area QP_S, $QP\_th1 \leq QP < QP\_th2$ for the quantization parameter medium area QP_M, and $QP\_th2 \leq QP < QP\_max$ for the quantization parameter large area QP_L, where QP_min is a possible minimum value of a quantization parameter value QP, QP_max is a possible maximum value of the quantization parameter value QP, and QP_th1 and QP_th2 are thresholds, and $QP\_min < QP\_th1 < QP\_th2 < QP\_max$, and the code amount adjustment circuitry (1) generates the code amount adjustment signal instructing the coding circuitry to set the quantization parameter value used in the quantization to a value included in the quantization parameter large area QP_L when a current frame image is determined to be complex based on the complexity of the current frame image obtained by the complexity obtaining circuitry and is determined to contain noise based on the result of the noise determination performed by the noise determination circuitry, (2) generates the code amount adjustment signal instructing the coding circuitry to set the quantization parameter value used in the quantization to a value included in the quantization parameter medium area QP_M when the current frame image is determined to be complex based on the complexity of the current frame image obtained by the complexity obtaining circuitry and is determined not to contain containing noise based on the result of the noise determination performed by the noise determination circuitry, (3) generates the code amount adjustment signal instructing the coding circuitry to set the quantization parameter value used in the quantization to a value included in the quantization parameter medium area QP_M when the current frame image is determined not to be complex based on the complexity of the current frame image obtained by the complexity obtaining circuitry and is determined to contain noise based on the result of the noise determination performed by the noise determination circuitry, and (4) generates the code amount adjustment signal instructing the coding circuitry to set the quantization parameter value used in the quantization to a value included in the quantization parameter small area QP_S when the current frame image is determined not to be complex based on the complexity of the current frame image obtained by the complexity obtaining circuitry and is determined not to contain noise based on the result of the noise determination performed by the noise determination circuitry.

13. A moving image coding method, comprising:

performing orthogonal transform of an input moving image including a plurality of frame images;

obtaining a complexity of the input moving image based on frequency component data obtained through the orthogonal transform performed by the step of performing orthogonal transform of the input moving image;

determining, prior to quantization, noise contained in the input moving image based on the frequency component data obtained through the orthogonal transform performed by the step of performing orthogonal transform of the input moving image;

generating a code amount adjustment signal based on the complexity obtained by the step of obtaining the complexity of the input moving image and a result of the noise determination performed by the step of determining noise contained in the input moving image;

performing a coding process including the quantization on the input moving image, the step of performing the coding process including performing the quantization using a quantization parameter value determined based on the code amount adjustment signal generated by the step of generating the code amount adjustment signal; and setting a plurality of quantization parameter areas, which are used for determining a quantization parameter value, based on a minimum value of a quantization parameter value, a maximum value of the quantization parameter value, a first threshold value of the quantization parameter value, and a second threshold value of the quantization parameter value.

14. A non-transitory computer readable storage medium storing a program enabling a computer to implement the moving image coding method according to claim 13.

15. An integrated circuit, comprising:

first orthogonal transform circuitry configured to perform orthogonal transform of an input moving image including a plurality of frame images;

complexity obtaining circuitry configured to obtain a complexity of the input moving image based on frequency component data obtained through the orthogonal transform performed by the first orthogonal transform circuitry;

noise determination circuitry configured to determine, prior to quantization, noise contained in the input moving image based on the frequency component data obtained through the orthogonal transform performed by the first orthogonal transform circuitry, code amount adjustment circuitry configured to generate a code amount adjustment signal based on the complexity obtained by the complexity obtaining circuitry and a result of the noise determination performed by the noise determination circuitry; and coding circuitry configured to subject the input moving image to a coding process including the quantization, the coding circuitry being configured to perform the quantization using a quantization parameter value determined based on the code amount adjustment signal generated by the code amount adjustment circuitry, wherein the coding circuitry sets a plurality of quantization parameter areas, which are used for determining a quantization parameter value, based on a minimum value of a quantization parameter value, a maximum value of the quantization parameter value, a first threshold value of the quantization parameter value, and a second threshold value of the quantization parameter value.

* * * * *